(12) United States Patent
Kawase et al.

(10) Patent No.: US 12,315,868 B2
(45) Date of Patent: May 27, 2025

(54) METHOD FOR MANUFACTURING BATTERY

(71) Applicant: Panasonic Intellectual Property Management Co., Ltd., Osaka (JP)

(72) Inventors: Akira Kawase, Osaka (JP); Kazuhiro Morioka, Osaka (JP); Akio Kaneyama, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 469 days.

(21) Appl. No.: 17/835,979

(22) Filed: Jun. 9, 2022

(65) Prior Publication Data

US 2022/0302490 A1    Sep. 22, 2022

Related U.S. Application Data

(63) Continuation of application No. PCT/JP2020/016400, filed on Apr. 14, 2020.

(30) Foreign Application Priority Data

Dec. 27, 2019  (JP) ................. 2019-238652

(51) Int. Cl.
*H01M 10/04* (2006.01)
*H01M 10/0585* (2010.01)

(52) U.S. Cl.
CPC ..... *H01M 10/0413* (2013.01); *H01M 10/049* (2013.01); *H01M 10/0585* (2013.01)

(58) Field of Classification Search
CPC ......... H01M 10/0413; H01M 10/0436; H01M 10/049; H01M 10/0525; H01M 10/0562; H01M 10/0565; H01M 10/0585
See application file for complete search history.

(56) References Cited

U.S. PATENT DOCUMENTS

2003/0118897 A1*  6/2003  Mino ............... H01L 23/58
                                                    429/149
2014/0079992 A1    3/2014  Tanaka
(Continued)

FOREIGN PATENT DOCUMENTS

JP    2012-038433    2/2012
JP    2012-089388    5/2012
(Continued)

OTHER PUBLICATIONS

The EPC Office Action dated Sep. 26, 2024 for the related European Patent Application No. 20906641.4.
(Continued)

*Primary Examiner* — Minh N Trinh
(74) *Attorney, Agent, or Firm* — Greenblum & Bernstein, P.L.C.

(57) ABSTRACT

A method for manufacturing a battery includes (a) laminating an insulating layer on a part of at least one surface of at least one first collector, (b) laminating at least one power-generating element in which an electrode active material layer, a solid electrolyte layer, and a counter-electrode active material layer are laminated in this order and the at least one first collector on which the insulating layer is laminated such that the electrode active material layer covers the insulating layer, (c) cutting, in a laminating direction at a position where the insulating layer is divided, the at least one first collector on which the at least one power-generating element are laminated, and (d), before or after cutting the at least one power-generating element in the cutting (c), laminating a second collector on a surface of the at least one power-generating element that is opposite to the at least one first collector.

10 Claims, 28 Drawing Sheets

(56) References Cited

U.S. PATENT DOCUMENTS

| | | | |
|---|---|---|---|
| 2018/0048023 A1* | 2/2018 | Ohsawa | H01M 4/0404 |
| 2019/0252728 A1 | 8/2019 | Shimizu et al. | |
| 2022/0302490 A1* | 9/2022 | Kawase | H01M 10/049 |

FOREIGN PATENT DOCUMENTS

| | | |
|---|---|---|
| JP | 2013-182842 A | 9/2013 |
| JP | 2016-207286 | 12/2016 |
| WO | 2012/164642 | 12/2012 |

OTHER PUBLICATIONS

International Search Report of PCT application No. PCT/JP2020/016400 dated Jun. 30, 2020.

* cited by examiner

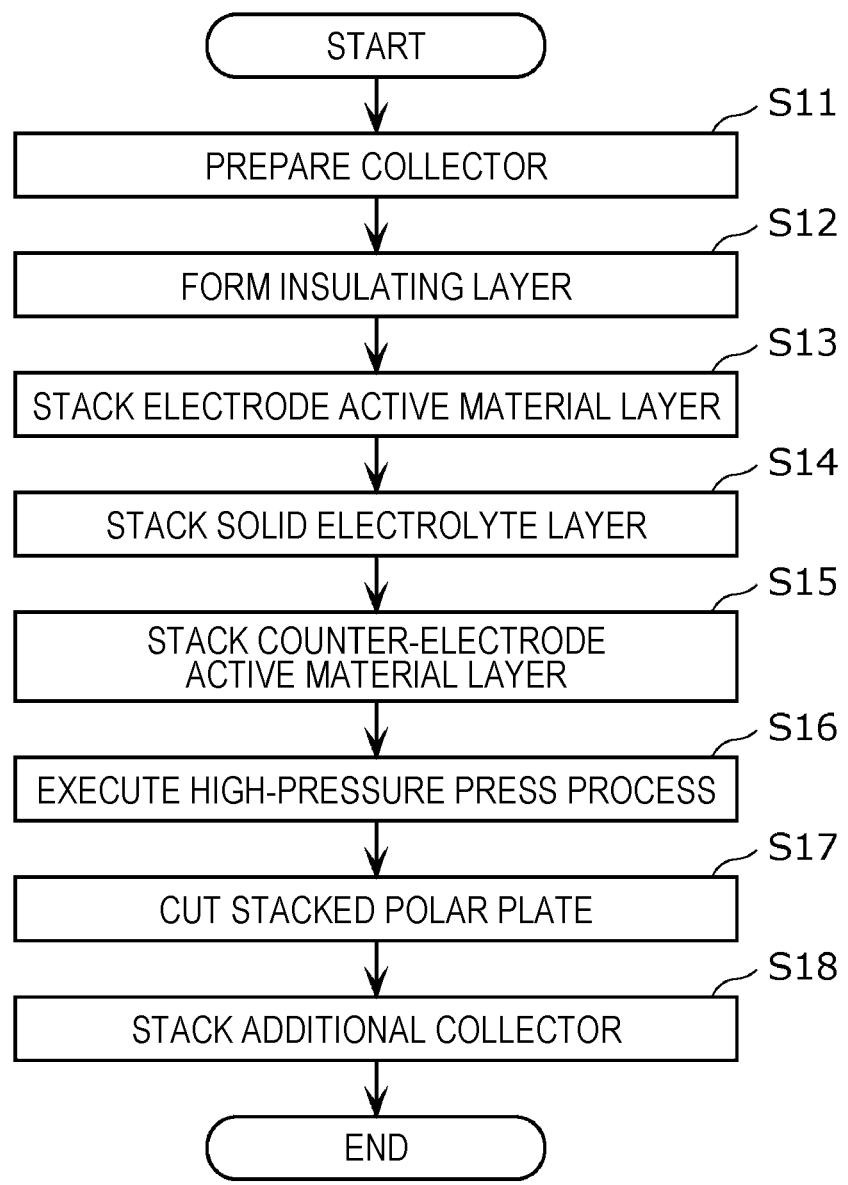

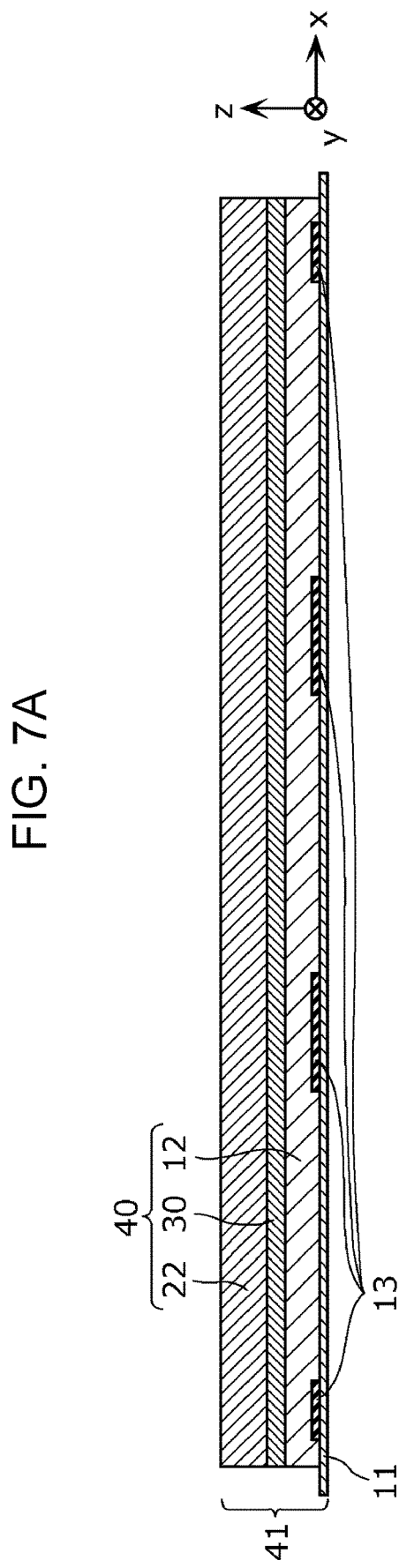

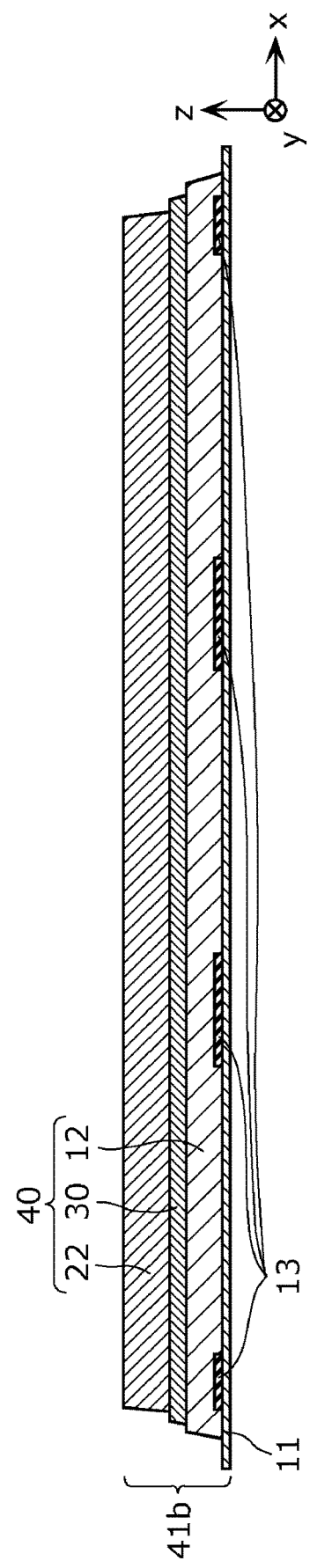

METHOD FOR MANUFACTURING BATTERY

BACKGROUND

1. Technical Field

The present disclosure relates to a method for manufacturing a battery.

2. Description of the Related Art

International Publication No. 2012/164642 and Japanese Unexamined Patent Application Publication No. 2016-207286 each disclose a battery including an insulating layer.

Further, Japanese Unexamined Patent Application Publication No. 2012-089388 discloses a method for manufacturing an all-solid battery including the step of pressurizing a powder material in forming each layer of the all-solid battery.

SUMMARY

The conventional technology is required to improve the volume energy density of a battery and simplify a method for manufacturing a battery.

One non-limiting and exemplary embodiment provides a method for manufacturing a battery that makes it possible to easily manufacture a battery with a high volume energy density.

In one general aspect, the techniques disclosed here feature a method for manufacturing a battery including (a) laminating an insulating layer on a part of at least one surface of at least one first collector, (b) laminating at least one power-generating element in which an electrode active material layer, a solid electrolyte layer, and a counter-electrode active material layer are laminated in this order and at least one first collector on which the insulating layer is laminated such that the electrode active material layer covers the insulating layer, (c) cutting, in a laminating direction at a position where the insulating layer is divided, the at least one first collector on which the at least one power-generating element are laminated, and (d), before or after cutting the at least one power-generating element in the cutting (c), laminating a second collector on a surface of the at least one power-generating element that is opposite to the at least one first collector.

The present disclosure makes it possible to easily manufacture a battery with a high volume energy density.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flow chart for explaining a method for manufacturing a battery according to Embodiment 1;

FIG. 7A is a schematic cross-sectional view showing an example of a laminated polar plate according to Embodiment 1;

FIG. 7C is a schematic cross-sectional view showing another example of a laminated polar plate according to Embodiment 1;

DETAILED DESCRIPTIONS

Figure 1:
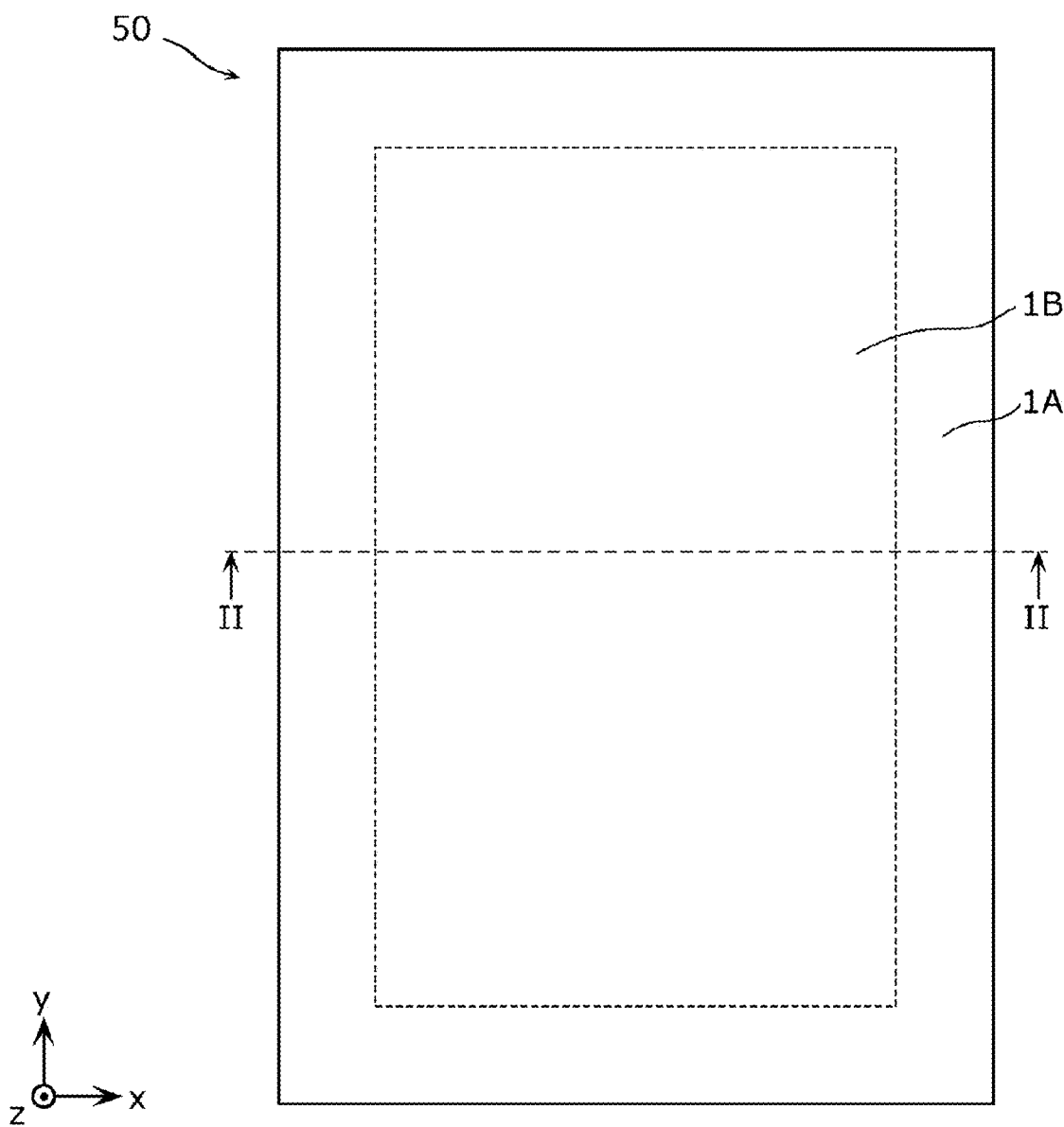
FIG. 1 is a schematic top view showing an example of a battery according to Embodiment 1.

Underlying Knowledge Forming Basis of the Present Disclosure

In a case where a battery such as an all-solid battery including a solid electrolyte layer containing a solid electrolyte is manufactured, it is common to make the area of a negative-electrode active material layer larger than the area of a positive-electrode active material layer. This is intended to stabilize the performance of the battery by making the capacitance of the negative-electrode active material layer larger than the capacitance of the positive-electrode active material layer to suppress, for example, deposition of metal derived from metal ions not incorporated into the negative-electrode active material layer. Further, this is also intended to improve the reliability of the battery by suppressing the concentration of electric fields at ends of the negative-electrode active material layer to inhibit dendrite growth (deposition of metal) at the ends. Further, in a case where the area of the negative-electrode active material layer is made larger, the solid electrolyte layer, for example, is disposed around the positive-electrode active material layer, which is placed opposite the negative-electrode active material layer. This keeps the positive-electrode active material layer out of contact with ends of a collector that easily peel, thus enhancing the reliability also by reducing exposure of the positive-electrode active material layer even in a case where the ends of the collector peel.

However, it is difficult to manufacture a battery while precisely controlling the area of a positive-electrode active material layer and the area of a negative-electrode active material layer as mentioned above. Further, for the purpose ensuring reliability, it is necessary to form the positive-electrode active material layer in consideration of the dimensional accuracy with which the positive-electrode active material layer is formed. This undesirably causes the positive-electrode active material layer to be small and causes the volume energy density of the battery to be low. Further, increasing the dimensional accuracy of the positive-electrode active material layer raises concern about an increase in the number of steps such as inspections and an increase in facility cost.

To address this problem, the present disclosure provides a method for manufacturing a battery that makes it possible to easy manufacture a battery with a high volume energy density. In particular, the present disclosure provides a method for manufacturing a battery that makes it possible to easily manufacture a highly-reliable battery with a high volume energy density.

The following gives a brief description of an aspect of the present disclosure.

According to an aspect of the present disclosure, there is provided a method for manufacturing a battery including (a) laminating an insulating layer on a part of at least one surface of at least one first collector, (b) laminating at least one power-generating element in which an electrode active material layer, a solid electrolyte layer, and a counter-electrode active material layer are laminated in this order and the at least one first collector on which the insulating layer is laminated such that the electrode active material layer covers the insulating layer, (c) cutting, in a laminating direction at a position where the insulating layer is divided, the at least one first collector on which the at least one power-generating element are laminated, and (d), before or after cutting the at least one power-generating element in the cutting (c), laminating a second collector on a surface of the at least one power-generating element that is opposite to the at least one first collector.

In this way, the first collector on which the power-generating element is laminated is cut in the laminating direction at the position where the insulating layer is divided. This makes it unnecessary to laminate the layers of the power-generating element in shapes into which they have been cut, thus making it possible to easily manufacture the battery.

Further, since the first collector on which the power-generating element is laminated is cut in the laminating direction at the position where the insulating layer is divided, the battery is manufactured with the insulating layer laminated at ends of the first collector in plan view. Further, since the electrode active material layer is laminated so as to cover the insulating layer laminated on the first collector, the first collector, the insulating layer, and the electrode active material layer are laminated in this order at the ends of the first collector of the battery thus manufactured. Therefore, even if the first collector peels at the ends of the first collector, at which peeling tends to occur, exposure of the electrode active material layer is reduced, as the insulating layer is exposed. This results in making it hard for damage, a short circuit, or other failures to occur due to contact between the electrode active material layer and another member. This makes it possible to manufacture a highly-reliable battery.

Further, the dimensions of the insulating layer can be determined simply by adjusting cutting position. Therefore, although the presence of the insulating layer inhibits the electrode active material layer and the first collector from giving and receiving ions to and from each other and results in the formation of a region in which the electrode active material layer hardly functions as an electrode, the region can be minimized by adjusting the dimensions of the insulating layer. This makes it possible to easily manufacture a battery with a high volume energy density.

Further, for example, the electrode active material layer may be a positive-electrode active material layer, and the counter-electrode active material layer may be a negative-electrode active material layer.

In this way, the laminating of the insulating layer at the ends of the first collector prevents electrons from the first collector from reaching ends of the positive-electrode active material layer, so that the function of the positive-electrode active material layer as an electrode at the ends is inhibited. That is, the substantive area of the positive-electrode active material layer in plan view is reduced, so that the positive-electrode active material layer tends to be narrower in area than the negative-electrode active material layer. Therefore, the capacitance of the negative-electrode active material layer tends to be substantially larger than the capacitance of the positive-electrode active material layer. This suppresses deposition of metal derived from metal ions not incorporated into the negative-electrode active material layer, making it possible to further enhance the reliability of the battery to be manufactured.

Further, for example, the at least one first collector may include a plurality of first collectors. In the laminating (a), the insulating layer may be laminated only on one surface of each of the plurality of first collectors. The laminating (b) may include (ba) forming a plurality of first laminated bodies by laminating the at least one power-generating element on each of the plurality of first collectors on which the insulating layer is laminated such that the electrode active material layer covers the insulating layer, and (bb) laminating the plurality of first laminated bodies such that positions of the insulating layers of the plurality of first laminated bodies overlap each other in plan view. In the laminating (bb), the plurality of first laminated bodies may be laminated such that the counter-electrode active material layer of a first one of two adjacent first laminated bodies included in the plurality of first laminated bodies faces the first collector of a second one of the two adjacent first laminated bodies. In the cutting (c), the plurality of first laminated bodies may be collectively cut in the laminating direction at the position where the insulating layer is divided.

In this way, a series-laminated battery is manufactured by laminating the plurality of first laminated bodies such that the first collector of the first one of the adjacent first laminated bodies is sandwiched between the electrode active material layer of the first one of the two adjacent first laminated bodies and the counter-electrode active material layer of the second one of the adjacent first laminated bodies. Further, the plurality of first laminated bodies are collectively cut by cutting the plurality of first laminated bodies in the laminating direction at the position where the insulating layer is divided. This makes it unnecessary to form a laminated battery by laminating single cells formed individually into intended shapes, bringing about improvement in efficiency in the manufacture of the battery.

Further, for example, the at least one first collector may include a plurality of first collectors. In the laminating (a), the insulating layer may be laminated only on one surface of each of the plurality of first collectors. The laminating (b) may include (bc) forming a plurality of second laminated bodies by laminating the at least one power-generating element on each of the plurality of first collectors on which the insulating layer is laminated such that the counter-electrode active material layer and a surface of the first collector on which the insulating layer is not laminated face each other, and (bd) laminating the plurality of second laminated bodies such that positions of the insulating layers of the plurality of first laminated bodies overlap each other in plan view. In the laminating (bd), the plurality of second laminated bodies may be laminated such that the electrode active material layer of a first one of two adjacent second laminated bodies included in the plurality of second laminated bodies covers the insulating layer of a second one of the two adjacent second laminated bodies. In the cutting (c), the plurality of second laminated bodies may be collectively cut in the laminating direction at the position where the insulating layer is divided.

In this way, a series-laminated battery is manufactured by laminating the plurality of second laminated bodies such that the first collector of the second one of the adjacent second laminated bodies is sandwiched between the electrode active material layer of the first one of the two adjacent second laminated bodies and the counter-electrode active material layer of the second one of the adjacent second laminated bodies. Further, the plurality of second laminated bodies are collectively cut by cutting the plurality of second laminated bodies in the laminating direction at the position where the insulating layer is divided. This makes it unnecessary to form a laminated battery by laminating single cells formed individually into intended shapes, bringing about improvement in efficiency in the manufacture of the battery.

Further, for example, the at least one power-generating element may include two power-generating elements. In the laminating (a), the insulating layer may be laminated on both surfaces of the at least one first collector. In the laminating (b), the at least one first collector on which the insulating layer is laminated, the two power-generating elements, and a third collector may be laminated such that the at least one first collector is sandwiched between the two power-generating elements so as for the electrode active material layer to cover the insulating layer laminated on both surfaces of the at least one first collector and such that a first one of the two power-generating elements is sandwiched between the at least one first collector on which the insulating layer is laminated and the third collector. In the cutting (c), the at least one first collector on which the third collector and the two power-generating elements are laminated may be cut in the laminating direction at the position where the insulating layer is divided. In the laminating (d), the second collector may be laminated on a side of a second one of the two power-generating elements that is opposite to the first collector.

In this way, a parallel-laminated battery is manufactured by laminating the two power-generating elements and the first collector such that the first collector is sandwiched between the electrode active material layers of the two power-generating elements. The two power-generating elements are collectively cut by cutting the first collector on which the two power-generating elements are laminated in the laminating direction at the position where the insulating layer is divided. This makes it unnecessary to form a laminated battery by laminating single cells formed individually into intended shapes, bringing about improvement in efficiency in the manufacture of the battery.

Further, for example, in the laminating (b), the at least one power-generating element may be formed by the electrode active material layer, the solid electrolyte layer, and the counter-electrode active material layer being sequentially laminated over the at least one first collector.

In this way, the first collector on which the power-generating element is laminated is formed simply by sequentially laminating the layers of the power-generating element on top of the first collector. This makes it possible to more easily laminate the power-generating element on the first collector.

Further, for example, in the laminating (a), the insulating layer may be laminated into a grating shape or a striped shape in plan view on at least one surface of the at least one first collector, and in the cutting (c), the at least one first collector on which the at least one power-generating element are laminated may be cut along the insulating layer.

In this way, the insulating layer is divided along a direction parallel with the length of the insulating layer. This makes it possible to easily form a battery having an insulating layer formed along ends of the battery.

Further, for example, the insulating layer may contain resin.

This makes it possible to enhance the bondability between the insulating layer and the first collector and between the insulating layer and the electrode active material layer, for example, through an anchor effect by which the resin contained in the insulating layer penetrates into the first collector and the electrode active material layer.

Further, for example, the insulating layer may contain a metal oxide.

This makes the insulating layer hard. Therefore, even in a case where the insulating layer is thinly formed at the time of manufacture of the battery, the insulating layer hardly deforms in being laminated on another layer. The insulating layer thus formed can be a thin layer of uniform thickness.

Further, for example, in the laminating (b), the at least one power-generating element may be laminated by using a wet coating method.

By thus overlaying the electrode active material layer, the solid electrolyte layer, and the counter-electrode active material layer by using a wet coating method, a battery can be easily formed in which the bondability or other characteristics of the interface between a material of each of the layers and a material of another are favorable.

The following describes embodiments in concrete terms with reference to the drawings.

It should be noted that the embodiments to be described below each illustrate a comprehensive and specific example. The numerical values, shapes, materials, constituent elements, placement and topology of constituent elements, or other features that are shown in the following embodiments are just a few examples and are not intended to limit the present disclosure.

Further, terms such as "parallel" and "flush" used herein to show the way in which elements are interrelated, terms such as "flat" and "rectangular" used herein to show the shape of an element, and ranges of numerical values used herein are not expressions that represent only exact meanings but expressions that are meant to also encompass substantially equivalent ranges, e.g. differences of approximately several percent.

Further, the drawings are not necessarily strict illustrations. In the drawings, substantially the same components are given the same reference signs, and a repeated description may be omitted or simplified.

Further, in the present specification and drawings, the x axis, the y axis, and the z axis represent the three axes of a three-dimensional orthogonal coordinate system. In each of the embodiments, the z-axis direction is a laminating direction of a battery. Further, a positive direction parallel with the z axis is upward in the z-axis direction, and a negative direction parallel with the z axis is downward in the z-axis direction. Further, the term "plan view" used herein means a case where the battery is seen from an angle parallel with the z axis. Further, the term "thickness" used herein means the length of each layer in the laminating direction.

Further, the terms "above" and "below" in the configuration of a battery used herein do not refer to an upward direction (upward in a vertical direction) and a downward direction (downward in a vertical direction) in absolute space recognition, but are used as terms that are defined by a relative positional relationship on the basis of an order of laminating in a laminating configuration. Further, the terms "above" and "below" are applied not only in a case where two constituent elements are placed at a spacing from each other with another constituent element present between the two constituent elements, but also in a case where two constituent elements touch each other by being placed in close contact with each other.

Embodiment 1

The following describes a battery according to Embodiment 1. The battery according to Embodiment 1 is a single cell including one electrode active material layer and one counter-electrode active material layer.

Configuration

Figure 2:
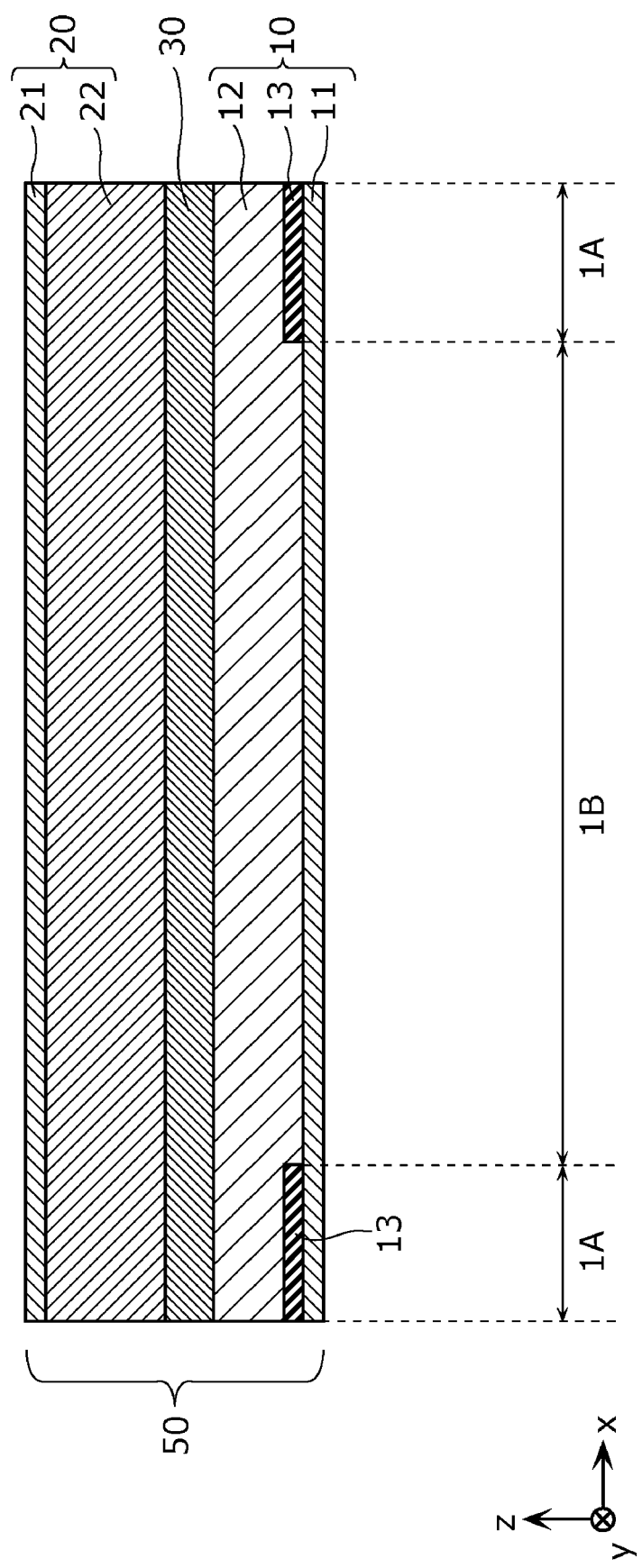
FIG. 2 is a cross-sectional view taken along line II-II in FIG. 1.

First, a configuration of the battery according to Embodiment 1 is described with reference to the drawings. FIG. 1 is a schematic top view showing an example of a battery according to the present embodiment. FIG. 2 is a cross-sectional view as taken along line II-II in FIG. 1.

As shown in FIGS. 1 and 2, the battery 50 according to the present embodiment includes an electrode layer 10, a counter-electrode layer 20 placed opposite the electrode layer 10, and a solid electrolyte layer 30 located between the electrode layer 10 and the counter-electrode layer 20. That is, the battery 50 has a structure in which the electrode layer 10, the solid electrolyte layer 30, and the counter-electrode layer 20 are laminated in this order.

The electrode layer 10 has a collector 11, an electrode active material layer 12 located between the collector 11 and the solid electrolyte layer 30, and an insulating layer 13 located between the collector 11 and the electrode active material layer 12 at ends of the electrode layer 10 in plan view. The collector 11 and the electrode active material layer 12 are identical in shape and position to each other in plan view.

The counter-electrode layer 20 has a collector 21 and a counter-electrode active material layer 22 located between the collector 21 and the solid electrolyte layer 30.

The battery 50 is for example an all-solid battery. A side surface of the battery 50 is parallel with the laminating direction. Further, the side surface of the battery 50 is a flat surface. In other words, a side surface of the electrode layer 10, a side surface of the counter-electrode layer 20, and a side surface of the solid electrolyte layer 30 are in a stepless state, and are located at the same flat surface. That is, the side surface of the electrode layer 10, the side surface of the counter-electrode layer 20, and the side surface of the solid electrolyte layer 30 are flush with one another. It should be noted that the term "side surface" refers to a surface of each constituent element of the battery 50 that extends from an end of a principal surface in a direction intersecting the principal surface, with the principal surface being a flat surface that is perpendicular to the laminating direction. Further, at an end of the electrode layer 10 in a direction perpendicular to the laminating direction, a side surface of the insulating layer 13, a side surface of the electrode active material 12, and a side surface of the collector 11 are flush with one another. Further, at an end of the counter-electrode layer 20 in a direction perpendicular to the laminating direction, a side surface of the counter-electrode active material layer 22 and a side surface of the collector 21 are flush with each other. That is, at an end of the battery 50 in a direction perpendicular to the laminating direction, the respective side surfaces of the collector 11, the insulating layer 13, the electrode active material layer 12, the solid electrolyte layer 30, the counter-electrode active material layer 22, and the collector 21 are flush with one another, and form the same flat surface. This makes the side surfaces of the layers of the battery 50 free from steps or asperities, thus preventing the formation of a space that does not function as a battery due to asperities and bringing about improvement in substantive volume energy density of the battery 50. Further, since the side surfaces of the layers can be made flush with one another, for example, by collectively cutting the layers, the battery 50 can be manufactured with the area of the insulating layer 13 easily adjusted.

The side surface of the battery 50 is for example a cut surface. Specifically, the side surface of the battery 50 is a surface formed by being cut with the edge of a cutter or other tools for cutting and, for example, is a surface having traces of cutting such as fine grooves. Since the battery 50 has a cut surface formed by being thus cut, the location to form the insulating layer 13 can be adjusted. This makes it possible to reduce the area of a portion (i.e. a portion in which the insulating layer 13 is formed, which will be described in detail later) that does not contribute to the charge-discharge performance of the battery 50, making it possible to improve the volume energy density. Further, since the side surface of the battery 50 is a cut surface, the side surface of the electrode layer 10, the side surface of the counter-electrode layer 20, and the side surface of the solid electrolyte layer 30 can be easily made flush with one another. It should be noted that the traces of cutting may be smoothed by polishing. The cut surface is not limited to particular shapes; however, in the case of the battery 50, the cut surface is rectangular.

Further, in the battery 50, the respective side surfaces of the collector 11, the insulating layer 13, the electrode active material layer 12, the solid electrolyte layer 30, the counter-electrode active material layer 22, and the collector 21 are exposed. This brings about improvement in volume energy density of the battery 50, and as layers that contribute to the charge-discharge performance of the battery 50 are present to ends of the battery 50.

Further, in the battery 50, the collector 11, the electrode active material layer 12, the solid electrolyte layer 30, the counter-electrode active material layer 22, and the collector 21 are identical in shape and position to one another in plan view. The shapes of the collector 11, the electrode active material layer 12, the solid electrolyte layer 30, the counter-electrode active material layer 22, and the collector 21 in plan view are rectangles, but are not limited to particular shapes and may be circles, ellipses, polygons, or other shapes.

The collector 11 is in contact with lower surfaces of the electrode active material layer 12 and the insulating layer 13, and covers the lower surfaces of the electrode active material layer 12 and the insulating layer 13. At ends of the collector 11 in plan view, the insulating layer 13 is laminated. The thickness of the collector 11 is for example greater than or equal to 5 μm and smaller than or equal to 100 μm.

As a material of the collector 11, a publicly-known material may be used. As the collector 11, a foil-like body, a plate-like body, a net-like body, or other bodies composed of, for example, copper, aluminum, nickel, irons, stainless steel, platinum, gold, an alloy of two or more types thereof, or other substances are used.

The electrode active material layer 12 is laminated above the collector 11 so as to cover the insulating layer 13, which is on top of the collector 11. The lower surface of the electrode active material layer 12 is also in contact with the collector 11. An upper surface of the electrode active material layer 12 is in contact with the solid electrolyte layer 30. The electrode active material layer 12 and the counter-electrode active material layer 22 face each other across the solid electrolyte layer 30. The electrode active material layer 12 has a region that does not overlap the insulating layer 13 in plan view. Further, the electrode active material layer 12 and the counter-electrode active material layer 22 are identical in shape and position to each other in plan view. The thickness of the electrode active material layer 12 is for example greater than or equal to 5 μm and smaller than or equal to 300 μm. A material for use in the electrode active material layer 12 will be described later.

As mentioned above, the insulating layer 13 is located between the collector 11 and the electrode active material layer 12. An upper surface of the insulating layer 13 and an inner side surface of the insulating layer 13 in plan view are in contact with the electrode active material layer 12. The insulating layer 13 is in contact with the electrode active material layer 12 at the ends of the electrode layer 10 in plan view. The side surface of the insulating layer 13 and the side surface of the electrode active material 12 are flush with each other. The lower surface of the insulating layer 13 is in contact with the collector 11. Further, the insulating layer 13 overlaps the counter-electrode active material layer 22 in plan view.

In the illustrated example, the insulating layer 13 is in the shape of a frame located on the outer periphery of the electrode layer 10 in plan view. That is, the insulating layer 13 is located between the collector 11 and the electrode active material layer 12 at all ends of the electrode layer 10 in directions perpendicular to the laminating direction.

The insulating layer 13 contains, for example, at least one of resin and a metal oxide. Examples of the resin include silicone resin, epoxy resin, and polyimide resin. The resin may be thermosetting resin or ultraviolet-curable resin. The inclusion of the resin by the insulating layer 13 makes it possible to enhance the bondability between the insulating layer 13 and the collector 11 and between the insulating layer 13 and the electrode active material layer 12, for example, through an anchor effect by which the resin penetrates into the collector 11 and the electrode active material layer 12. Examples of the metal oxide include silicon oxide, titanium oxide, and aluminum oxide. The inclusion of the metal oxide by the insulating layer 13 makes the insulating layer 13 hard. Therefore, even in a case where the insulating layer 13 is thinly formed at the time of manufacture of the battery 50, the insulating layer 13 hardly deforms in being laminated on another layer. The insulating layer 13 thus formed can be a thin layer of uniform thickness.

The thickness of the insulating layer 13 is thinner than the thickness of the electrode active material layer 12 and, for example, is sufficiently thin in comparison with the thickness of the electrode active material layer 12. By being thinner than the thickness of the electrode active material layer 12, the thickness of the insulating layer 13 makes it possible to lessen the influence of the insulating layer 13 even in a case where a high-pressure press process is performed at the time of laminating of the electrode active material layer 12 or other layers, thus making it easy for the electrode active material layer 12 or other layers to be uniformly compressed. Even in a case where a high-pressure press process is performed at the time of laminating of the electrode active material layer 12 or other layers, the thickness of the insulating layer 13 is for example smaller than or equal to 5 μm from the point of view of making it easy for the electrode active material layer 12 or other layers to be uniformly compressed. The thickness of the insulating layer 13 may be smaller than or equal to 2 μm or may be smaller than or equal to 1 μm from the point of view of battery characteristics. The insulating layer 13 is for example completely insulative, however, depending on battery characteristics required, the insulating layer 13 may slightly have electrical conductivity due to a constituent material and thickness of the insulating layer 13.

Further, the insulating layer 13 is located in a region in which a length of the electrode active material layer 12 from the outer periphery, for example, in plan view is shorter than or equal to 1 mm from the point of view of an effective area that contributes to power generation, e.g. from the point of view of volume energy density. Further, a width of the insulating layer 13 in a case where the insulating layer 13 is formed in the shape of a frame or a line or other shapes is for example smaller than or equal to 1 mm, and may be smaller than or equal to 0.5 mm or may be smaller than or equal to 0.1 mm from the point of view of volume energy density. The width of the insulating layer 13 is changed, for example, depending on battery characteristics required.

The collector 21 is in contact with an upper surface of the counter-electrode active material layer 22, and covers the upper surface of the counter-electrode active material layer 22. The thickness of the collector 21 is for example greater than or equal to 5 μm and smaller than or equal to 100 μm. As a material of the collector 21, the material of the aforementioned collector 11 may be used.

The counter-electrode active material layer 22 is laminated on top of the solid electrolyte layer 30, and is placed opposite the electrode active material layer 12. The upper surface of the counter-electrode active material layer 22 is in contact with the collector 21. The thickness of the counter-electrode active material layer 22 is for example greater than or equal to 5 μm and smaller than or equal to 300 μm. A material for use in the counter-electrode active material layer 22 will be described later.

The solid electrolyte layer 30 is located between the electrode active material layer 12 and the counter-electrode active material layer 22. The thickness of the solid electrolyte layer 30 is for example greater than or equal to 5 μm and smaller than or equal to 150 μm.

The solid electrolyte layer 30 contains at least a solid electrolyte and, if necessary, may contain a binder material. The solid electrolyte layer 30 may contain a solid electrolyte having lithium ion conductivity.

As the solid electrolyte, a publicly-known material such as a lithium ion conductor, a sodium ion conductor, or a magnesium ion conductor may be used. As the solid electrolyte, for example, a solid electrolyte material such as a sulfide solid electrolyte, a halogenated solid electrolyte, or an oxide solid electrolyte is used. In the case of a material that is able to conduct lithium ions, for example, a synthetic substance composed of lithium sulfide ($Li_2S$) and diphosphorous pentasulfide ($P_2S_5$) is used as the sulfide solid electrolyte. Further, as the sulfide solid electrolyte, a sulfide such as $Li_2S$—$SiS_2$, $Li_2S$—$B_2S_3$, or $Li_2S$—$GeS_2$ may be used, or a sulfide obtained by adding at least one type of $Li_3N$, LiCl, LiBr, $Li_3PO_4$, or $Li_4SiO_4$ as an additive to the aforementioned sulfide may be used.

In the case of a material that is able to conduct lithium ions, for example, $Li_7La_3Zr_2O_{12}$ (LLZ), $Li_{1.3}Al_{0.3}Ti_{1.7}(PO_4)_3$ (LATP), (La,Li)$TiO_3$ (LLTO), or other substances are used as the oxide solid electrolyte.

As the binder material, for example, elastomers are used, or an organic compound such as polyvinylidene fluoride, acrylic resin, or cellulose resin may be used.

In the present embodiment, one of the electrode layer 10, which includes the electrode active material layer 12, and the counter-electrode layer 20, which includes the counter-electrode active material layer 22, is a positive-electrode layer including a positive-electrode active material layer, and the other is a negative-electrode layer including a negative-electrode active material layer.

The positive-electrode active material layer contain at least a positive-electrode active material and, if necessary, may contain at least one of a solid electrolyte, a conductive aid, and a binder material.

As the positive-electrode active material, a publicly-known material that is capable of occlusion and ejection (insertion and desorption or dissolution and deposition) of lithium ions, sodium ions, or magnesium ions may be used. In the case of a material that is capable of desorption and insertion of lithium ions, for example, a lithium cobalt oxide complex oxide (LCO), a lithium nickel oxide complex oxide (LNO), a lithium manganese oxide complex oxide (LMO), a lithium-manganese-nickel complex oxide (LMNO), a lithium-manganese-cobalt complex oxide (LMCO), a lithium-nickel-cobalt complex oxide (LNCO), a lithium-nickel-manganese-cobalt complex oxide (LNMCO), or other substances are used as the positive-electrode active material.

As the solid electrolyte, the aforementioned solid electrolyte material may be used. Further, as the conductive aid, for example, a conducting material such as acetylene black, carbon black, graphite, or carbon fiber is used. Further, as the binder material, the aforementioned binder material may be used.

The negative-electrode active material layer contains at least a negative-electrode active material and, if necessary, may contain at least one of a solid electrolyte, a conductive aid, and a binder material similar to that of the positive-electrode active material layer.

As the negative-electrode active material, a publicly-known material that is capable of occlusion and ejection (insertion and desorption or dissolution and deposition) of lithium ions, sodium ions, or magnesium ions may be used. In the case of a material that is capable of desorption and insertion of lithium ions, for example, a carbon material such as natural graphite, synthetic graphite, graphite carbon fiber, or resin heat-treated carbon, metal lithium, a lithium alloy, an oxide of lithium and a transition metal element, or other substances are used as the negative-electrode active material.

In the case of manufacture of a battery, it is common, as mentioned above, to make the area of a negative-electrode active material layer larger than the area of a positive-electrode active material layer in plan view for the purpose of improving reliability. Furthermore, disposing ends of the negative-electrode active material layer further toward the outside than ends of the positive-electrode active material layer makes it possible to suppress the concentration of electric fields at the ends of the negative-electrode active material layer to inhibit dendrite growth (deposition of metal).

Figure 3:
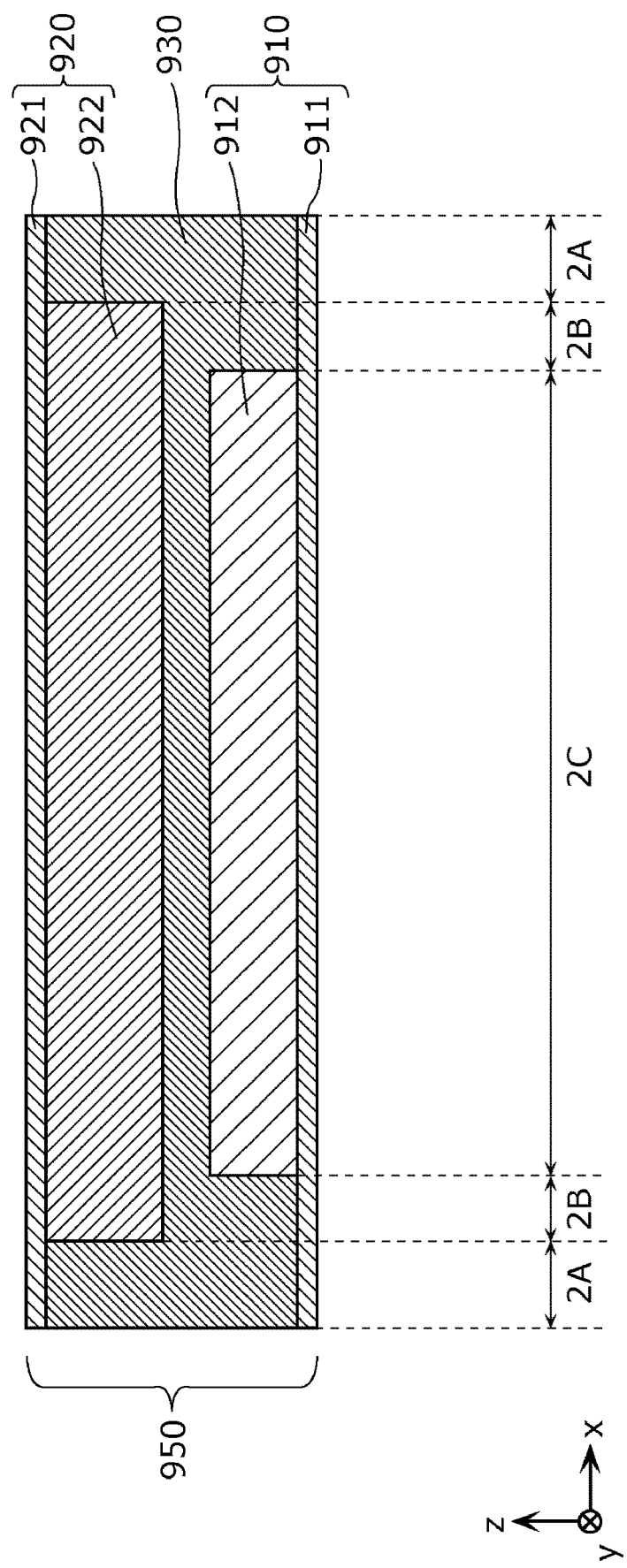
FIG. 3 is a schematic cross-sectional view showing an example of a battery according to a comparative example.
Figure 4:
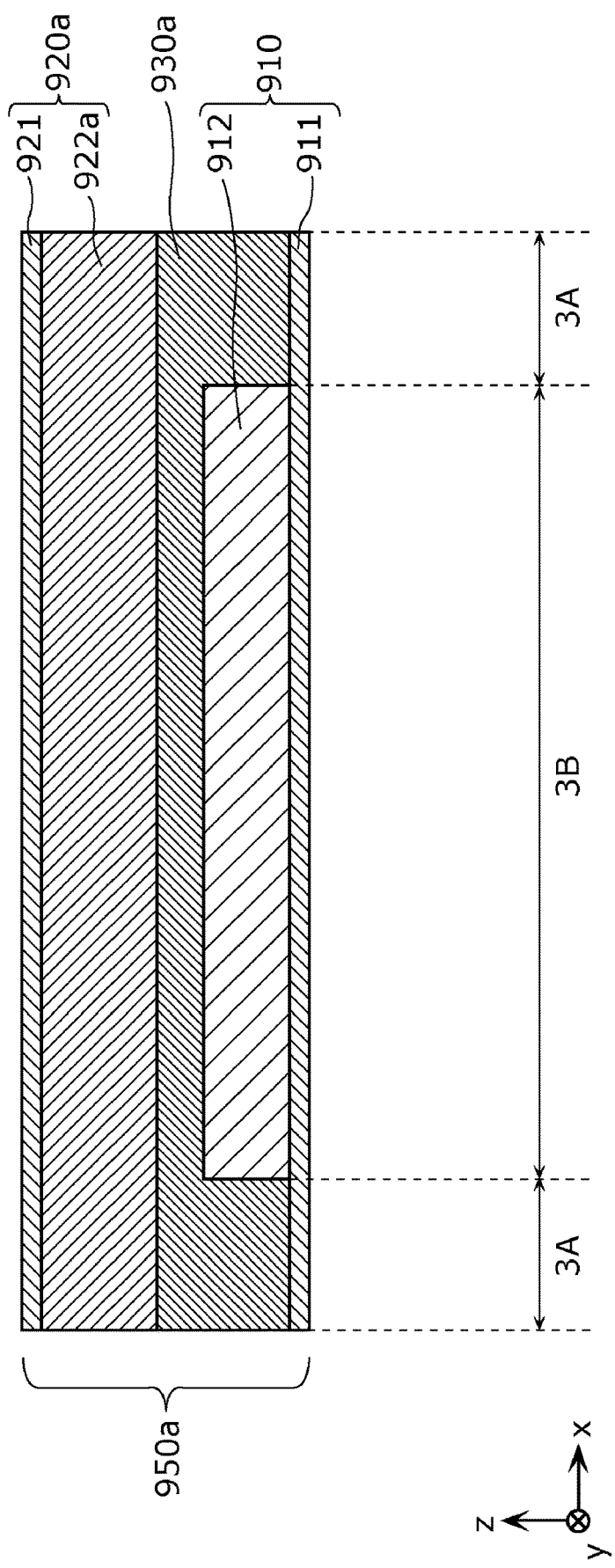
FIG. 4 is a schematic cross-sectional view showing another example of a battery according to the comparative example.

The following describes batteries 950 and 950a according to a comparative example in which the area of a negative-electrode active material layer is larger than the area of a positive-electrode active material layer in plan view. FIGS. 3 and 4 are schematic cross-sectional views showing examples of the batteries according to the comparative example.

As shown in FIG. 3, the battery 950 includes a positive-electrode layer 910, a negative-electrode layer 920, and a solid electrolyte layer 930 located between the positive-electrode layer 910 and the negative-electrode layer 920. The positive-electrode layer 910 has a collector 911 and a positive-electrode active material layer 912 located between the collector 911 and the solid electrolyte layer 930. The negative-electrode layer 920 has a collector 921 and a negative-electrode active material layer 922 located between the collector 921 and the solid electrolyte layer 930. The solid electrolyte layer 930 covers side surfaces of the positive-electrode active material layer 912 and the negative-electrode active material layer 922, and is in contact with the collector 911 and the collector 921. In a plan view of the battery 950, the area of the negative-electrode active material layer 922 is larger than the area of the positive-electrode active material layer 912, and ends of the negative-electrode active material layer 922 are located further toward the outside than ends of the positive-electrode active material layer 912. Thus, in the battery 950, deposition of metal is suppressed by making the area of the negative-electrode active material layer 922 is larger than the area of the positive-electrode active material layer 912. Further, the presence of the solid electrolyte layer 930 at ends of the battery 950 reduces exposure of the positive-electrode active material layer 912 and the negative-electrode active material layer 922 even in a case where the collector 911 and the collector 921 peel from the ends.

A region 2C in which the positive-electrode active material layer 912 and the negative-electrode active material layer 922 are present functions as a battery. Meanwhile, a region 2A in which neither the positive-electrode active material layer 912 nor the negative-electrode active material layer 922 is present does not function as a battery. Further, a region 2B in which the negative-electrode active material layer 922 is present but the positive-electrode active material layer 912 is not present does not function as a battery, either. The region 2B is a region that is equivalent to the difference in area between the positive-electrode active material layer 912 and the negative-electrode active material layer 922. As the region 2B and the region 2A become wider in plan view, the proportion of regions in the battery 950 that do not contribute to power generation increases, with the result that the volume energy density of the battery 950 decreases. Meanwhile, as the region 2B becomes narrower in plan view, higher alignment accuracy is required in manufacturing steps such as steps of laminating the respective layers, and the higher-accuracy requirements entail concern about an increase in the number of steps such as inspections and an increase in facility cost.

Further, the regions 2A, 2B, and 2C differ from one another in type and number of layers other than the collectors 911 and 921 that are present in a thickness direction. That is, in the region 2A, only one layer, namely the solid electrolyte layer 930, is present. In the region 2B, two layers, namely the negative-electrode active material layer 922 and the solid electrolyte layer 930, are present. In the region 2C, three layers, namely the positive-electrode active material layer 912, the negative-electrode active material layer 922, and the solid electrolyte layer 930, are present. In the case of an all-solid battery composed of powder materials, manufacturing steps may include a high-pressure press process to form a favorable interface between the powder materials (e.g. an interface with high bondability between the powder materials and with low grain boundary resistivity), i.e. to improve the reliability of the battery and improve the volume energy density by being highly filled. At this point in time, the regions 2A, 2B, and 2C differ in type and number of layers that constitute the regions, and the layers differ in compressibility from one another. This raises concern that when the whole battery 950 is pressed, the regions may differ in degree of compression from one another or may not be uniformly compressed. For example, there is concern that the regions 2A and 2B may be less sufficiently compressed than the region 2C and may suffer from reduced reliability such as the peeling of the layers.

That is, the battery 950 is undesirably hard to easily manufacture and insufficient in improvement of reliability. Further, since the region 2A, whose sole through-thickness layer is the solid electrolyte layer 930, is a portion that does not particularly contribute to the basis charge-discharge performance of the battery, it is preferable, from the point of view of improving the volume energy density, that the region 2A be small.

Further, the battery 950 shown in FIG. 4 includes a positive-electrode layer 910a having a collector 911a and a positive-electrode active material layer 912a, a negative-electrode layer 920a having a collector 921a and a negative-electrode active material layer 922a, and a solid electrolyte layer 930a. The battery 950a differ from the battery 950 in that the solid electrolyte layer 930a does not cover a side surface of the negative-electrode active material layer 922a. The battery 950a does not have a region, such as the region 2A, in which neither the positive-electrode active material layer 912 nor the negative-electrode active material layer 922 is present, but has a region 3A in which the positive-electrode active material layer 912a is not present. Therefore, the region 3A does not contribute to power generation, and a problem similar to that which arises in the region 2B arises in the region 3A of the battery 950a too.

Meanwhile, as mentioned above, the battery 50 includes an electrode layer 10, a counter-electrode layer 20 placed opposite the electrode layer 10, and a solid electrolyte layer 30 located between the electrode layer 10 and the counter-electrode layer 20. The electrode layer 10 has a collector 11, an electrode active material layer 12 located between the collector 11 and the solid electrolyte layer 30, and an insulating layer 13 located between the collector 11 and the electrode active material layer 12 at ends of the electrode layer 10 in plan view. The electrode active material layer 12 has a region that does not overlap the insulating layer 13 in plan view. A side surface of the insulating layer 13 and a side surface of the electrode active material 12 are flush with each other. Furthermore, the respective side surfaces of the collector 11, the insulating layer 13, the electrode active material layer 12, the solid electrolyte layer 30, the counter-electrode active material layer 22, and the collector 21 are flush with one another.

For this reason, even if the collector 11 peels at the ends of the collector 11, at which peeling tends to occur, exposure of the electrode active material layer 12 is reduced, as the insulating layer 13 is present between the collector 11 and the electrode active material layer 12, so that it becomes hard for damage, a short circuit, or other failures to occur due to contact between the electrode active material layer 12 and another member. This brings about improvement in reliability of the battery 50.

Since the respective side surfaces of the collector 11, the insulating layer 13, the electrode active material layer 12, the solid electrolyte layer 30, the counter-electrode active material layer 22, and the collector 21 are flush with one another, the battery 50 can be manufactured with the area of the insulating layer 13 easily adjusted, for example, by collectively cutting the layers. Therefore, although the presence of the insulating layer 13 inhibits the electrode active material layer 12 and the collector 11 from giving and receiving ions to and from each other and results in the formation of a region in which the electrode active material layer 12 hardly functions as an electrode, the region can be minimized by adjusting the area of the insulating layer 13. This makes it possible to increase the volume energy density of the battery.

Further, since the insulating layer 13 is located between the collector 11 and the electrode active material layer 12, the electrode active material layer 12 is also present on top of the insulating layer 13. Therefore, even in a case where a high-pressure press process is performed, all regions are more easily uniformly compressed than, for example, in a case where a solid electrolyte layer is present on the side surface of the electrode active material layer 12 as in the case of a battery according to the aforementioned comparative example. This makes it hard for the layers of the battery 50 to peel and makes it possible to improve the reliability and volume energy density of the battery 50 through a high-pressure press process.

Further, in the battery 50, for example, the electrode layer 10, which includes the electrode active material layer 12, is a positive-electrode layer including a positive-electrode active material layer, and the counter-electrode layer 20, which includes the counter-electrode active material layer 22, is a negative-electrode layer including a negative-electrode active material layer. In this case, the positive-electrode active material layer (electrode active material layer 12), which is in contact with the insulating layer 13, is not directly reached by electrons from the collector 11, so that a portion of the positive-electrode active material layer that is in a region 1A shown in FIGS. 1 and 2 hardly functions as an electrode. Meanwhile, a portion of the positive-electrode active material layer that is in a region 1B functions as an electrode. Therefore, in the battery 50, the region 1A hardly functions as a battery, and the region 1B functions as a battery. In the battery 50, although the areas of the positive-electrode active material layer and the negative-electrode active material layer (counter-electrode active material layer 22) in plan view are equal, an effect of reducing the area of the positive-electrode active material layer in plan view is substantially brought about, as the portion of the positive-electrode active material layer that is in the region 1A hardly functions as an electrode. That is, in the battery 50, deposition of metal is suppressed even when the areas of the positive-electrode active material layer and the negative-electrode active material layer in plan view are equal.

Further, since the positive-electrode active material layer and the negative-electrode active material layer are identical in shape and position to each other in plan view and the insulating layer 13 is located at the ends of the positive-electrode layer (electrode layer 10), a portion of the positive-electrode active material layer placed opposite the ends of the negative-electrode active material layer hardly functions as an electrode. As a result, the concentration of electric fields at the ends of the negative-electrode active material layer is suppressed, so that dendrite growth at the ends is inhibited. This brings about improvement in reliability of the battery 50.

Furthermore, at the time of manufacture of the battery 50, it is not necessary to form the positive-electrode active material layer or the negative-electrode active material layer with high position and area accuracy, as the substantive area of the positive-electrode active material can be adjusted by the insulating layer 13. This makes it possible to easily manufacture the battery 50. For example, the battery 50 is easily manufactured, for example, by cutting, in a region including the insulating layer 13, a laminated body obtained by laminating the positive-electrode layer (electrode layer 10), the solid electrolyte layer 30, and the negative-electrode layer (counter-electrode layer 20).

Manufacturing Method

The following describes a method for manufacturing a battery according to the present embodiment. It should be noted that the following method for manufacturing a battery 50 is just an example, and the method for manufacturing a battery 50 is not limited to the following example.

The method for manufacturing a battery 50 includes an insulating layer laminating step (a), a power-generating element laminating step (b), a cutting step (c), and a collector laminating step (d). The following describes each of the steps in detail.

(1) Insulating Layer Laminating Step (a)

First, the insulating layer laminating step (a) is described. FIG. 5 is a flow chart for explaining a method for manufacturing a battery according to the present embodiment.

In the insulating layer laminating step (a), an insulating layer 13 is laminated on at least one surface of a collector 11. The collector 11 is an example of a first collector. Specifically, first, the collector 11 is prepared (step S11 of FIG. 5). Then, the insulating layer 13 is laminated on at least one surface of the collector 11 thus prepared (step S12 of FIG. 5). For example, the insulating layer 13 is laminated on the collector 11 by forming the insulating layer 13 on an upper surface of the collector 11.

Figure 6A:
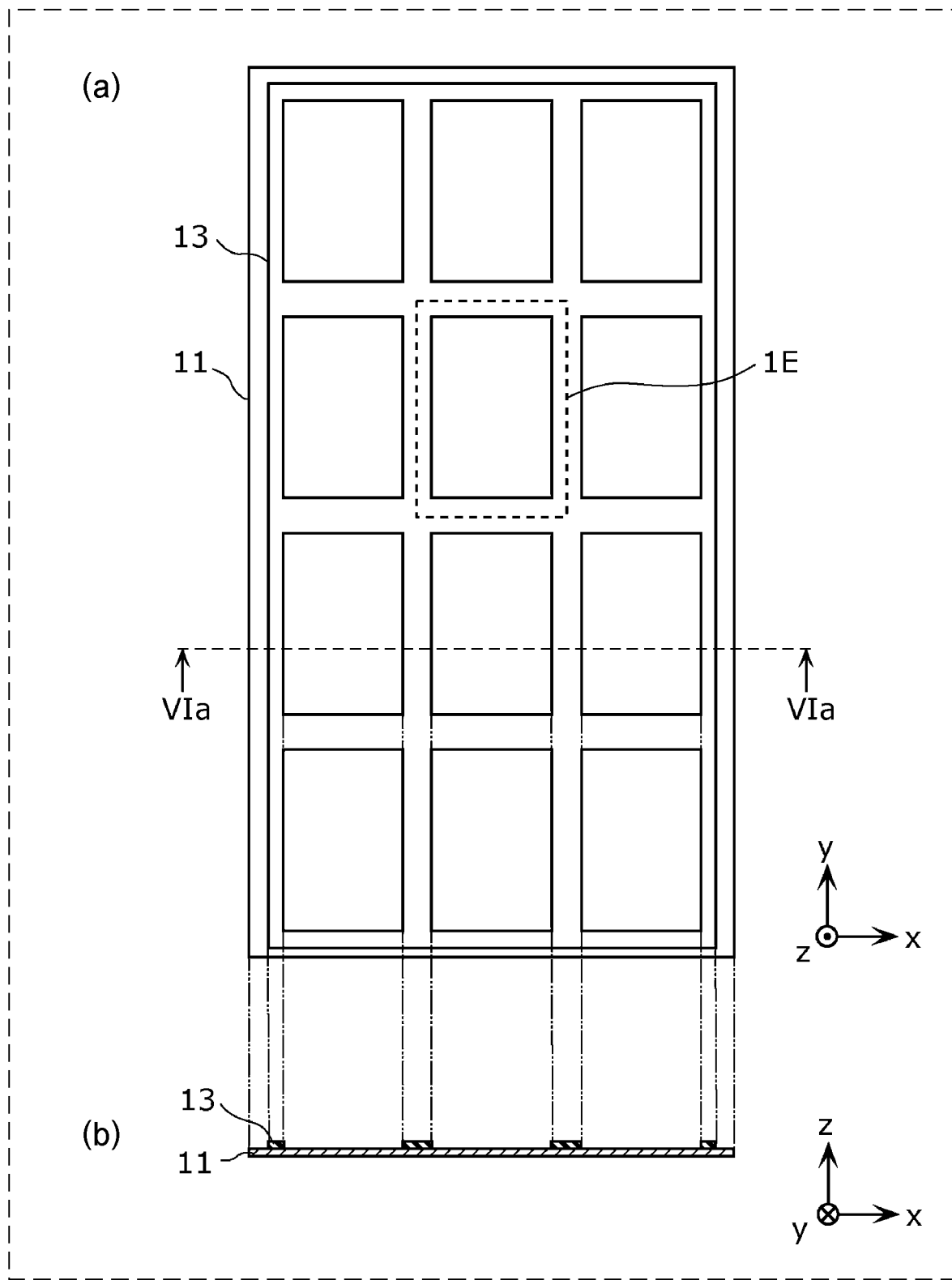
FIG. 6A is a schematic view showing an example of a collector on which an insulating layer is laminated according to Embodiment 1.
Figure 6B:
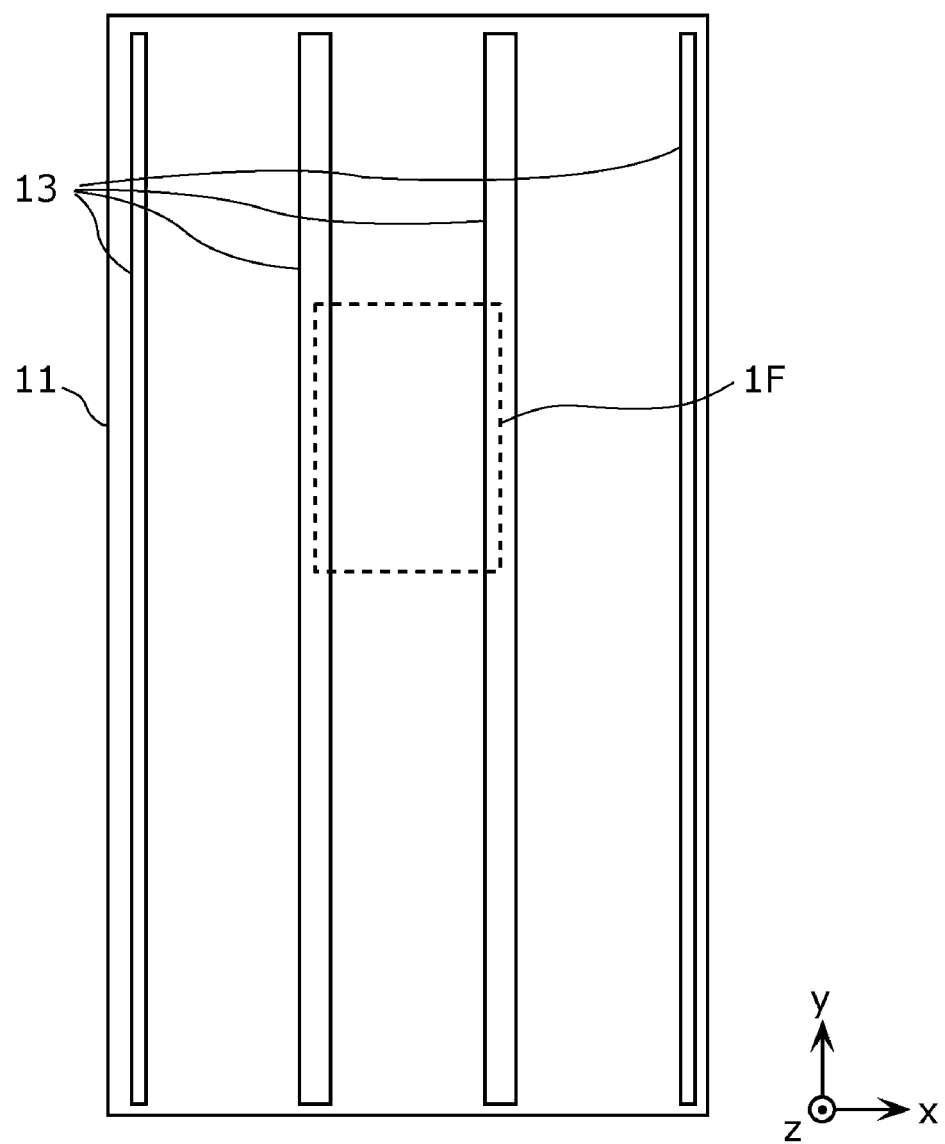
FIG. 6B is a schematic view showing another example of a collector on which an insulating layer is laminated according to Embodiment 1.
Figure 6C:
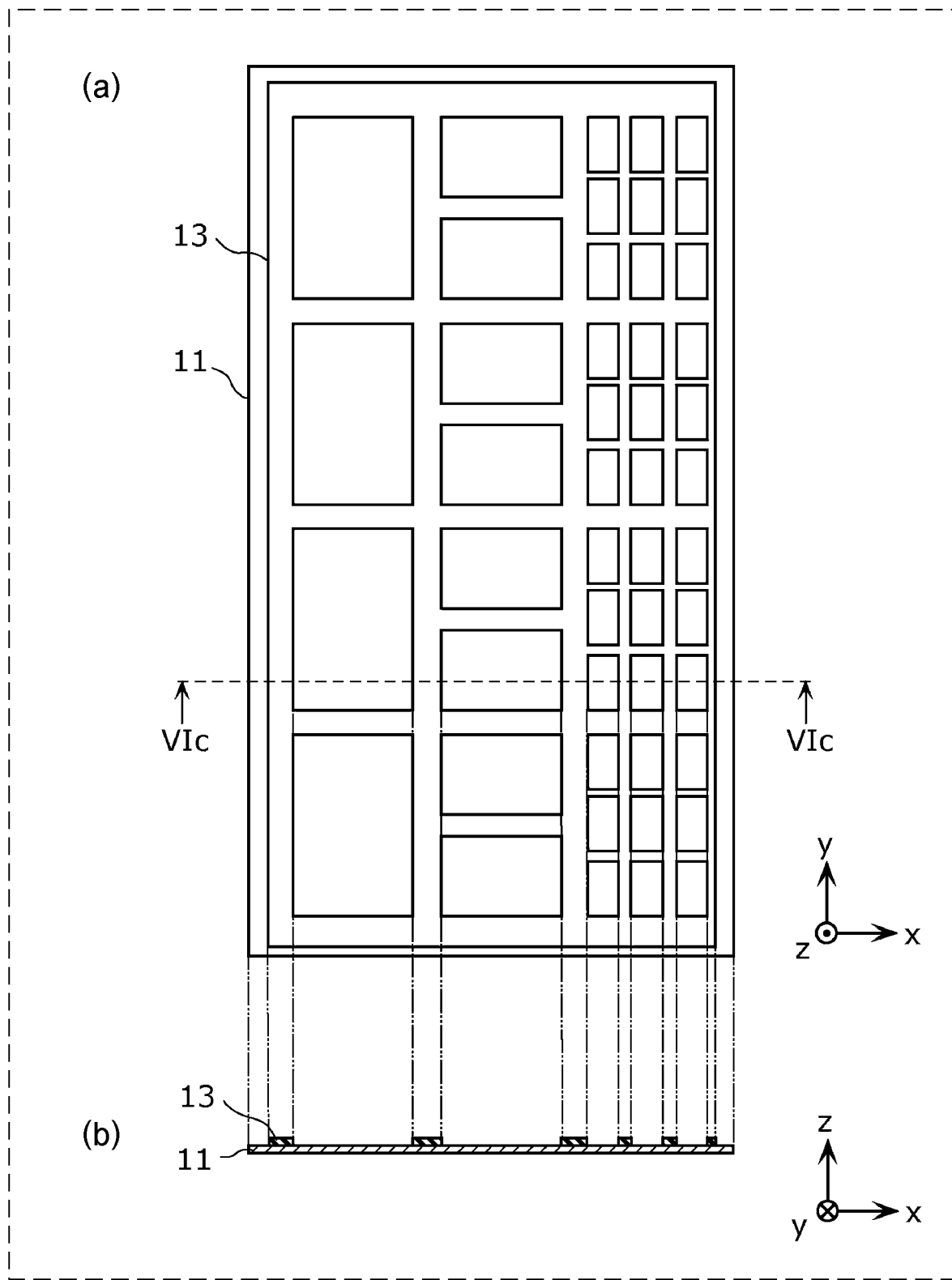
FIG. 6C is a schematic view showing another example of a collector on which an insulating layer is laminated according to Embodiment 1.

FIGS. 6A, 6B, and 6C are schematic views showing examples of a collector 11 on which an insulating layer 13 is laminated. (a) of FIG. 6A is a top view showing an example of a collector 11 and on which insulating layer 13 is laminated, and (b) of FIG. 6A is a cross-sectional view taken along line VIa-VIa in (a) of FIG. 6A. For example, as shown in FIG. 6A, the insulating layer 13 is formed into a grating shape. Further, FIG. 6B is a top view showing another example of a collector 11 on which an insulating layer 13 is laminated. Although FIG. 6B does not illustrate a cross-sectional view, the collector 11 on which the insulating layer 13 is laminated shown in FIG. 6B has a cross-sectional structure similar to that of (b) of FIG. 6A. As shown in FIG. 6B, the insulating layer 13 may be formed into a striped shape. By thus laminating the insulating layer 13 into a comparatively simple shape in plan view, such as a grating shape or a striped shape, having an elongated portion, the insulating layer 13 can be easily formed on the collector 11. Further, by the insulating layer 13 being divided along a direction parallel with the length of the insulating layer 13 in the after-mentioned cutting step (c), a battery 50 can be easily formed with the insulating layer 13 formed along ends of the battery 50. In FIGS. 6A and 6B, rectangular regions 1E and 1F indicated by dotted lines are equivalent to the size of one battery 50. Thus, the insulating layer 13 may be laminated on the collector 11 so that the insulating layer 13 can be divided into a plurality of batteries in a later manufacturing step.

Further, (a) of FIG. 6C is a top view showing still another example of a collector 11 on which an insulating layer 13 is laminated, and (b) of FIG. 6C is a cross-sectional view taken along line VIc-VIc in (a) of FIG. 6C. As shown in FIG. 6C, a grating-shaped insulating layer 13 of multiple types of pattern (e.g. grating space) may be formed on top of the collector 11.

By the insulating layer 13 being laminated into a grating shape or a striped shape and divided along a direction parallel with the length of the grating shape or the striped shape of the insulating layer 13 in the after-mentioned cutting step (c), a plurality of batteries 50 of the same shape or different shapes can be simultaneously manufactured. This brings about improvement in efficiency in the manufacture of batteries 50.

As a method for forming the insulating layer 13, there are a variety of possible processes; however, from the point of view of mass-producibility, for example, an application process is used. For example, paint obtained by dispersing an insulating substance (e.g. a metal oxide) into a solvent is applied onto the collector 11 as a material of the insulating layer 13 by a high-accuracy coating method such as a gravure roll method or an inkjet method in a continuous process such as a roll-to-roll process, and the solvent is evaporated by drying, whereby the insulating layer 13 can be obtained. This makes it possible to thinly laminate the insulating layer 13, so that the insulating layer 13 thus formed is a thin layer of uniform thickness. Therefore, in a case where a high-pressure press process is performed in laminating another layer in the after-mentioned power-generating element laminating step (b), the layer is hardly affected by the insulating layer 13 and easily uniformly compressed. Further, by using such a high-accuracy coating method, the accuracy of the area of the electrode active material layer 12 that is substantially effective as an electrode is increased.

In a case where resin is used as the material of the insulating layer 13, a solution obtained by dissolving or dispersing resin may be applied onto the collector 11, or ultraviolet-curable resin or thermosetting resin may be applied onto the collector 11 and subjected to a curing process. It should be noted that the formation of the insulating layer 13 is not limited to a continuous process such as a roll-to-roll process, but may be a batch process for forming the insulating layer 13 for each single collector 11.

As the solvent for use in the formation of the insulating layer 13, a common organic solvent, aqueous solvent, or other solvents in which a metal oxide or resin is dispersed or dissolved may be used.

(2) Power-Generating Element Laminating Step (b)

Next, the power-generating element laminating step (b) is described. In the power-generating element laminating step (b), a power-generating element 40 in which an electrode active material layer 12, a solid electrolyte layer 30, and a counter-electrode active material layer 22 are laminated in this order and the collector 11 on which the insulating layer 13 is laminated in the insulating layer laminating step (a) are laminated such that the electrode active material layer 12 covers the insulating layer 13. Thus, in the power-generating element laminating step (b), a covering structure is formed in which the electrode active material layer 12 covers the insulating layer 13. In the power-generating element laminating step (b), the power-generating element 40 is formed, for example, by the electrode active material layer 12, the solid electrolyte layer 30, and the counter-electrode active material layer 22 being sequentially laminated over the collector 11. Specifically, the electrode active material layer 12, the solid electrolyte layer 30, and the counter-electrode active material layer 22 are laminated in this order on top of each other over the collector 11 on which the insulating layer 13 is laminated (steps S13, S14, and S15 of FIG. 5). For example, over the collector 11 on which the insulating layer 13 is laminated, the electrode active material layer 12 is laminated so as to cover the insulating layer 13; furthermore, the solid electrolyte layer 30 and the counter-electrode active material layer 22 are sequentially laminated. Furthermore, if necessary, a high-pressure press process is performed on the electrode active material layer 12, the solid electrolyte layer 30, and the counter-electrode active material layer 22, which were laminated in steps S13, S14, and S15 (step S16 of FIG. 5). Further, if necessary, a heat treatment is performed on the electrode active material layer 12, the solid electrolyte layer 30, and the counter-electrode active material layer 22, which were laminated in steps S13, S14, and S15. This gives a laminated polar plate in which the power-generating element 40 is laminated on top of the collector 11 on which the insulating layer 13 is laminated.

Figure 7B:
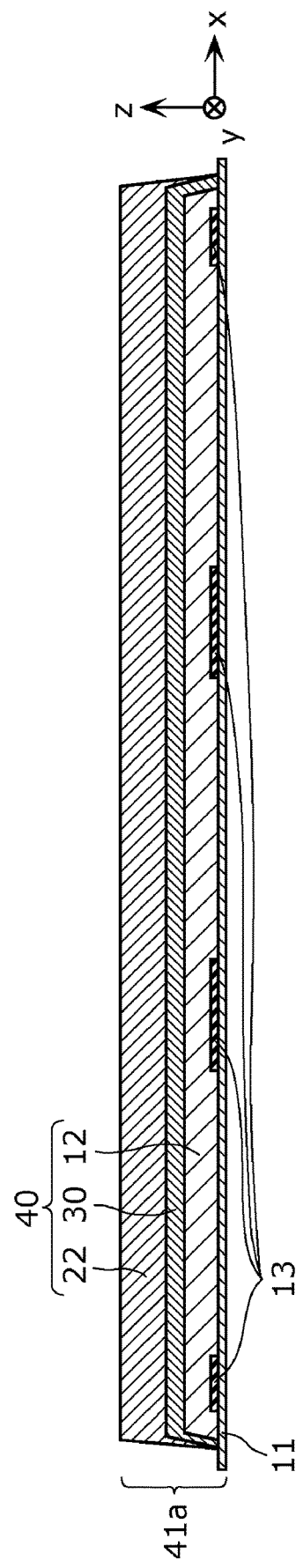
FIG. 7B is a schematic cross-sectional view showing another example of a laminated polar plate according to Embodiment 1.

FIGS. 7A, 7B, and 7C are schematic cross-sectional views showing examples of laminated polar plates according to the present embodiment. In a laminated polar plate 41, as shown in FIG. 7A, a power-generating element 40 obtained by laminating an electrode active material layer 12, a solid electrolyte layer 30, and a counter-electrode active material layer 22 in this order is laminated on top of a collector 11 on which an insulating layer 13 is laminated. The laminated polar plate 41 is formed such that the electrode active material layer 12, the solid electrolyte layer 30, and the counter-electrode active material layer 22 are identical in area and position to one another in plan view. Further, the counter-electrode active material layer 22 has its upper surface exposed.

The structure of the laminated polar plate 41 is not limited to this example. For example, as shown in FIG. 7B, a laminated polar plate 41a is formed such that a solid electrolyte layer 30 covers side and upper surfaces of an electrode active material layer 12 and a counter-electrode active material layer 22 covers side and upper surfaces of the solid electrolyte layer 30. This reduces the occurrence of a short circuit due to contact between the electrode active material layer 12 and the counter-electrode active material layer 22 in the power-generating element laminating step (b), as the electrode active material layer 12 is covered with the solid electrolyte layer 30.

Further, for example, as shown in FIG. 7C, a laminated polar plate 41b is formed such that an electrode active material layer 12 is smaller in area than a solid electrolyte layer 30 in plan view and the solid electrolyte layer 30 is smaller in area than a counter-electrode active material layer 22 in plan view. Further, in a plan view, the counter-electrode active material layer 22 is located within the solid electrolyte layer 30, the solid electrolyte layer 30 is located within the electrode active material layer 12. Since the counter-electrode active material layer 22 is designed to be located within the solid electrolyte layer 30, the solid electrolyte layer 30 reduces the occurrence of a short-circuit due to contact between the electrode active material layer 12 and the counter-electrode active material layer 22 even if the counter-electrode active material layer 22 is laminated with a misalignment in plan view.

A laminated polar plate in the present embodiment may be a structure of any of the laminated polar plates 41, 41a, and 41b, or a structure other than the laminated polar plates 41, 41a, and 41b will do, provided such a structure is a structure in which a power-generating element 40 is laminated on top of a collector 11 on which an insulating layer 13 is laminated.

The electrode active material layer 12, the solid electrolyte layer 30, and the counter-electrode active material layer 22, which constitute the power-generating element 40, are formed in sequence, for example, by using a wet coating method. The use of the wet coating method makes it possible to easily laminate the power-generating element 40 on the collector 11. Usable examples of the wet coating method include, but are not limited to, coating methods such as a die coating method, a doctor blade method, a roll coater method, a screen printing method, and an inkjet method.

In a case where the wet coating method is used, a paint-making step is executed in which slurries are obtained separately by appropriately mixing together each of the materials that form the electrode active material layer 12, the solid electrolyte layer 30, and the counter-electrode active material layer 22 (i.e. each of the aforementioned materials of the positive-electrode active material layer, the solid electrolyte layer 30, and the negative-electrode active material layer) and a solvent.

As the solvent for use in the paint-making step, a publicly-known solvent that is used in fabricating a publicly-known all solid battery (e.g. a lithium-ion all-solid battery) may be used.

The slurries, obtained in the paint-making step, of the respective layers are applied over the collector 11 on which the insulating layer 13 is laminated. This layered coating is executed in the order of the electrode active material layer 12, the solid electrolyte layer 30, and then the counter-electrode active material layer 22. In so doing, the overlaying of a layer being overlaid first may be followed by the overlaying of a next layer, or the overlaying of the next layer may be started during the overlaying of the layer being overlaid first. That is, steps S13, S14, and S15 may be concurrently executed. The slurries of the respective layers are sequentially applied, and after all layers have been applied, a heat treatment that removes the solvents and the binder materials and a high-pressure press process that accelerates the filling of the materials of the respective layers are executed, for example. It should be noted that the heat treatment and the high-pressure press process may be executed each time a layer is overlaid. That is, step S16 may be executed between steps S13 and S14 and between steps S14 and S15. In the overlaying of the electrode active material layer 12, the solid electrolyte layer 30, and the counter-electrode active material layer 22, the heat treatment and the high-pressure press process may be executed each time one layer is overlaid, may be executed separately after any two layers have been overlaid and after one layer has been overlaid, or may be executed collectively after all three layers have been overlaid. Further, the high-pressure press process involves the use of, for example, a roll press, a flat-plate press, or other presses. It should be noted that at least one of the heat treatment and the high-pressure press process may not be performed.

Performing a layered coating method in this way makes it possible to improve the bondability of the interface between each of the layers, namely the collector 11, the insulating layer 13, the electrode active material layer 12, the solid electrolyte layer 30, and the counter-electrode active material layer 22, and another and reduce interface resistance, and also makes it possible to improve the bondability between the powder materials used in the electrode active material layer 12, the solid electrolyte layer 30, and the counter-electrode active material layer 22 and reduce grain boundary resistivity. That is, favorable interfaces are formed between each of the layers of the power-generating element 40 and another and between each of the powder materials contained in the respective layers and another.

It should be noted that the insulating layer laminating step (a) and the power-generating element laminating step (b) may be performed in a series of continuous processes such as roll-to-roll processes.

(3) Cutting Step (c) and Collector Laminating Step (d)

Figure 8:
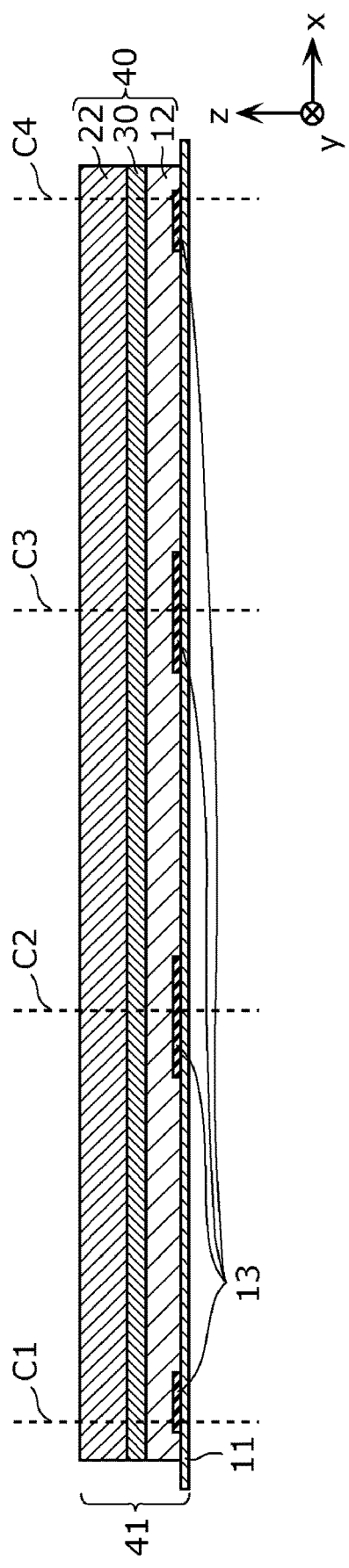
FIG. 8 is a diagram for explaining a cutting step (c) of the method for manufacturing a battery according to Embodiment 1.

Next, the cutting step (c) and the collector laminating step (d) are described. FIG. 8 is a diagram for explaining the cutting step (c) of the method for manufacturing a battery according to the present embodiment. In the cutting step (c), the collector 11 on which the power-generating element 40 is in the power-generating element laminating step (b), i.e. the laminated polar plate 41, 41*a*, or 41*b*, is cut in the laminating direction at a position where the insulating layer 13 is divided (step S17 of FIG. 5). As shown in FIG. 8, the laminated polar plate 41 is cut with a blade, laser light, or other devices at the positions of dashed lines C1, C2, C3, and C4 where the insulating layer 13 is disposed. At the positions of the dashed lines C1, C2, C3, and C4, the collector 11, the insulating layer 13, the electrode active material layer 12, the solid electrolyte layer 30, and the counter-electrode active material layer 22 are laminated in this order, and they are collectively cut. This makes it unnecessary to laminate the layers of the power-generating element 40 in shapes into which they have been cut, thus making it possible to easily manufacture batteries 50. For example, in a case where the insulating layer 13 is laminated in a grating shape or a striped shape in plan view, such as that show in FIG. 6A, 6B, or 6C, having an elongated portion, the collector 11 on which the power-generating element 40 is laminated is cut along a direction parallel with the length of the grating shape or the striped shape of the insulating layer 13. This gives batteries 50 having the insulating layer 13 located at all ends facing cut surfaces of the batteries 50 thus manufactured.

Next, in the collector laminating step (d), after the laminated polar plate 41 has been cut in the cutting step (c), a collector 21 is laminated as an additional collector on a surface of the power-generating element 40 of the laminated polar plate 41 that is opposite to the collector 11 (i.e. a surface of the power-generating element 40 perpendicular to the laminating direction on which the collector 11 is not laminated) (step S18 of FIG. 5). The additional collector is an example of a second collector. Specifically, the collector 21 is bonded by a press process or other processes to the exposed upper surface of the counter-electrode active material layer 22 of the laminated polar plate 41 thus cut. The press process is performed at lower pressure than the high-pressure press process performed in step S16. This gives a battery 50 shown in FIG. 2.

It should be noted that the cutting step (c) and the collector laminating step (d) may be transposed. That is, before the laminated polar plate 41 is cut in the cutting step (c), the collector 21 may be laminated first on the surface of the power-generating element 40 of the laminated polar plate 41 that is opposite to the collector 11, and then the laminated polar plate 41 on which the collector 21 is laminated may be cut in the laminating direction at the position where the insulating layer 13 is divided. Further, in the collector laminating step (d), a conductive substrate or chassis may be laminated as an additional collector instead of the collector 21 on the surface of the power-generating element 40 that is opposite to the collector 11.

Thus, the method for manufacturing a battery 50 includes the cutting step (c) of cutting along a position where the collector 11, the insulating layer 13, the electrode active material layer 12, the solid electrolyte layer 30, and the counter-electrode active material layer 22 are laminated. This causes the respective side surfaces of the collector 11, the insulating layer 13, the electrode active material layer 12, the solid electrolyte layer 30, the counter-electrode active material layer 22, and the collector 21 to be exposed at ends in directions perpendicular to the laminating direction. It should be noted that the side surfaces exposed after cutting may be protected by a sealing member or other members that cover the side surfaces. That is, in a case where the side surfaces are covered with another member such as the sealing member, the side surfaces of all layers may not be exposed.

By thus including the cutting step (c) of cutting along the position where the collector 11, the insulating layer 13, the electrode active material layer 12, the solid electrolyte layer 30, and the counter-electrode active material layer 22 are laminated, ends of the collector 11, the insulating layer 13, the electrode active material layer 12, the solid electrolyte layer 30, the counter-electrode active material layer 22, and the collector 21 in directions perpendicular to the laminating direction are exposed.

(4) Effects

As noted above, the method for manufacturing a battery 50 according to the present embodiment includes an insulating layer laminating step (a), a power-generating element laminating step (b), a cutting step (c), and a collector laminating step (d). In the insulating layer laminating step (a), an insulating layer 13 is laminated on a portion of at least one surface of a collector 11. In the power-generating element laminating step (b), a power-generating element 40 in which an electrode active material layer 12, a solid electrolyte layer 30, and a counter-electrode active material layer 22 are laminated in this order and the collector 11 on which the insulating layer 13 is laminated are laminated such that the electrode active material layer 12 covers the insulating layer 13. In the cutting step (c), the collector 11 on which the power-generating element 40 is laminated is cut in the laminating direction at a position where the insulating layer 13 is divided. In the collector laminating step (d), before the power-generating element 40 is cut in the cutting step (c) or after the power-generating element 40 has been cut in the cutting step (c), a collector 21 is laminated on a surface of the power-generating element 40 that is opposite to the collector 11.

In this way, the collector 11 on which the power-generating element 40 is laminated is cut in the laminating direction at the position where the insulating layer 13 is divided. This makes it unnecessary to laminate the layers of the power-generating element 40 in shapes into which they have been cut, thus making it possible to easily manufacture the battery 50.

Further, since the collector 11 on which the power-generating element 40 is laminated is cut in the laminating direction at the position where the insulating layer 13 is divided, the battery is manufactured with the insulating layer 13 laminated at ends of the collector 11 in plan view. Furthermore, since the electrode active material layer 12 is laminated so as to cover the insulating layer 13 laminated on the collector 11, the collector 11, the insulating layer 13, and the electrode active material layer 12 are laminated in this order at the ends of the collector 11 of the battery 50 thus manufactured. Therefore, even if the collector 11 peels at the ends of the collector 11, at which peeling tends to occur, exposure of the electrode active material layer 12 is reduced, as the insulating layer 13 is exposed. This results in making it hard for damage, a short circuit, or other failures to occur due to contact between the electrode active material layer 12 and another member. This makes it possible to manufacture a highly-reliable battery.

Further, the dimensions of the insulating layer 13 can be determined simply by adjusting cutting position. Therefore, although the presence of the insulating layer 13 inhibits the electrode active material layer 12 and the collector 11 from giving and receiving ions to and from each other and results in the formation of a region in which the electrode active material layer 12 hardly functions as an electrode, the region can be minimized by adjusting the dimensions of the insulating layer 13. This makes it possible to easily manufacture a battery 50 with a high volume energy density.

Further, in a case where the electrode active material layer 12 is a positive-electrode active material layer and the counter-electrode active material layer 22 is a negative-electrode active material layer, the laminating of the insulating layer 13 at the ends of the collector 11 prevents electrons from the collector 11 from reaching ends of the positive-electrode active material layer (electrode active material layer 12), so that the function of the positive-electrode active material layer as an electrode at the ends is inhibited. That is, the substantive area of the positive-electrode active material layer is reduced. Further, since the power-generating element 40 is cut in the laminating direction, the positive-electrode active material layer and the negative-electrode active material layer (counter-electrode active material layer 22) are identical in shape and position to each other in plan view, and are also identical in area to each other in plan view. This causes the positive-electrode active material layer to become narrower in substantive area (area that functions as an electrode) than the negative-electrode active material layer and be positioned within the negative-electrode active material layer in plan view. This results in suppression of deposition of metal on the negative-electrode active material layer as mentioned above. This brings about further improvement in reliability of the battery 50 to be manufactured.

Further, by being cut in the laminating direction, the collector 11 on which the power-generating element 40 is laminated (e.g. the laminated polar plate 41, 41a, or 41b) is cut to give a battery with the insulating layer laminated at the ends of the collector 11. This makes it unnecessary to separately laminate the positive-electrode active material layer and the negative-electrode active material layer for each single cell with the positive-electrode active material layer and the negative-electrode active material layer shaped with a difference in area, thus making it possible to easily manufacture batteries 50 with high production efficiency.

In the absence of the insulating layer 13, the electrode active material layer 12 is laminated at the ends of the collector 11 too. Therefore, even when the collector 11 on which the power-generating element 40 is laminated is cut, a battery is manufactured in which exposure of the electrode active material layer 12 cannot be reduced when the ends of the collector 11 peel and in which there is no substantive difference in area between the electrode active material layer 12 and the counter-electrode active material layer 22. Therefore, although a battery can be easily manufactured, such a battery is low in reliability, and it is hard to employ such a manufacturing method. On the other hand, in the manufacturing method according to the present embodiment, as mentioned above, the collector 11 on which the power-generating element 40 is laminated is cut at the position where the insulating layer 13 is divided. This makes it possible to, in addition to easily manufacturing a battery by cutting the collector 11 on which the power-generating element 40 is laminated, reduce exposure of the electrode active material layer 12, reduce the area of the electrode active material layer 12 that functions as an electrode, and adjust the area of the insulating layer 13. Such a laminating step (d) of laminating the insulating layer 13 on the collector 11 and the cutting step (c) of cutting, at the position where the insulating layer 13 is divided, the collector 11 on which the power-generating element 40 is laminated makes it possible to easily manufacture a highly-reliable battery with a high volume energy density.

(5) Other Manufacturing Methods

The method for manufacturing a battery according to the present embodiment is not limited to the aforementioned example but may for example be the following manufacturing method.

First, a collector 11 having a shape shown in FIG. 2 is prepared. Then, an application process or other processes are used to laminate an insulating layer 13 on top of the collector 11 in a shape shown in FIG. 2. An electrode active material layer 12 and a solid electrolyte layer 30 are laminated by layered coating in this order on top of each other all over the collector 11 on which the insulating layer 13 is laminated, whereby an electrode plate is obtained.

Next, a collector 21 having a shape shown in FIG. 2 is prepared. Then, a counter-electrode active material layer 22 and a solid electrolyte layer 30 are laminated by layered coating in this order on top of each other all over the collector 21, whereby a counter-electrode plate is obtained.

Next, the electrode plate thus obtained and the counter-electrode plate thus obtained are laminated such that their respective solid electrolyte layers 30 make contact with each other. The laminated body is pressed from both sides in the laminating direction by using a flat-plate press, whereby a battery 50 is obtained.

Alternatively, a battery 50 may be formed by forming a laminated body by laminating an insulating layer 13 and a power-generating element 40 on a substrate that is separate from a collector, cutting the laminated body in the laminating direction at a position where the insulating layer 13 is divided, if necessary, and then causes the laminated body thus obtained to be sandwiched between a collector 11 and a collector 21.

Modification 1

The following describes Modification 1 of Embodiment 1. The following describes Modification 1 of Embodiment 1 with a focus on differences from Embodiment 1, and omits or simplifies a description of common features.

Figure 9:
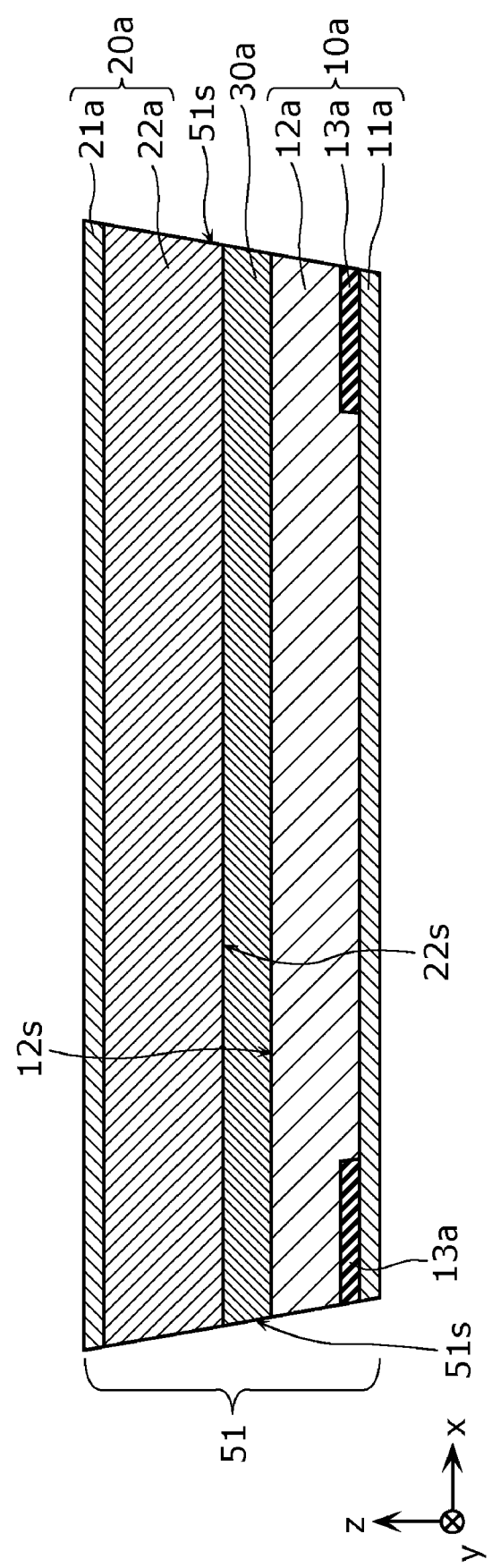
FIG. 9 is a schematic cross-sectional view showing an example of a battery according to Modification 1 of Embodiment 1.

FIG. 9 is a schematic cross-sectional view showing an example of a battery according to the present modification. As shown in FIG. 9, the battery 51 differs from the battery 50 of Embodiment 1 in that the battery 51 has side surfaces inclined with respect to the laminating direction.

The battery 51 includes an electrode layer 10a, a counter-electrode layer 20a placed opposite the electrode layer 10a, and a solid electrolyte layer 30a located between the electrode layer 10a and the counter-electrode layer 20a.

The electrode layer 10a has a collector 11a, an electrode active material layer 12a located between the collector 11a and the solid electrolyte layer 30a, and an insulating layer 13a located between the collector 11a and the electrode active material layer 12a at ends of the electrode layer 10a in plan view. The counter-electrode layer 20a has a collector 21a and a counter-electrode active material layer 22a located between the collector 21a and the solid electrolyte layer 30a.

A side surface 51s connecting two principal surfaces of the battery 51 that are perpendicular to the laminating direction is inclined in such a direction with respect to the laminating direction that the area of the counter-electrode layer 20a is larger than the area of the electrode layer 10a in plan view. In other words, the side surface 51s is inclined in such a direction with respect to the laminating direction that the width of the counter-electrode layer 20a is larger than the width of the electrode layer 10a in a cross-section obtained by cutting the battery 51 in the laminating direction. That is, in the battery 51, the area of a principal surface 22s of the counter-electrode active material layer 22a that faces the electrode active material layer 12a is larger than the area of a principal surface 12s of the electrode active material layer 12a that faces the counter-electrode active material layer 22s. Further, when seen from an angle parallel with the laminating direction, the principal surface 12s is located within the principal surface 22s. Further, in the battery 51, for example, the electrode layer 10a, which includes the electrode active material layer 12a, is a positive-electrode layer including a positive-electrode active material layer, and the counter-electrode layer 20a, which includes the counter-electrode active material layer 22a, is a negative-electrode layer including a negative-electrode active material layer. In this case, deposition of metal is suppressed in the battery 51, as the area of the negative-electrode active material layer is larger than the area of the positive-electrode active material layer in plan view.

Further, since, on the side surface 51s, a side surface of the solid electrolyte layer 30 too is inclined with respect to the laminating direction, the exposed surface of the solid electrolyte layer 30 is large, so that the distance between the electrode active material layer 12a and the counter-electrode active material layer 22a on the side surface 51s is long. This makes it hard for the electrode active material layer 12a and the counter-electrode active material layer 22a to make contact with each other, reducing the risk of a short circuit.

Further, all side surfaces 51s of the battery 51 including side surfaces 51s that are not illustrated are inclined with respect to the laminating direction, so that the area of the principal surface 22s is larger than the area of the principal surface 12s. It should be noted that all side surfaces 51s of the battery 51 do not need to be inclined with respect to the laminating direction, but at least one side surface 51s needs only be inclined with respect to the laminating direction.

Figure 10:
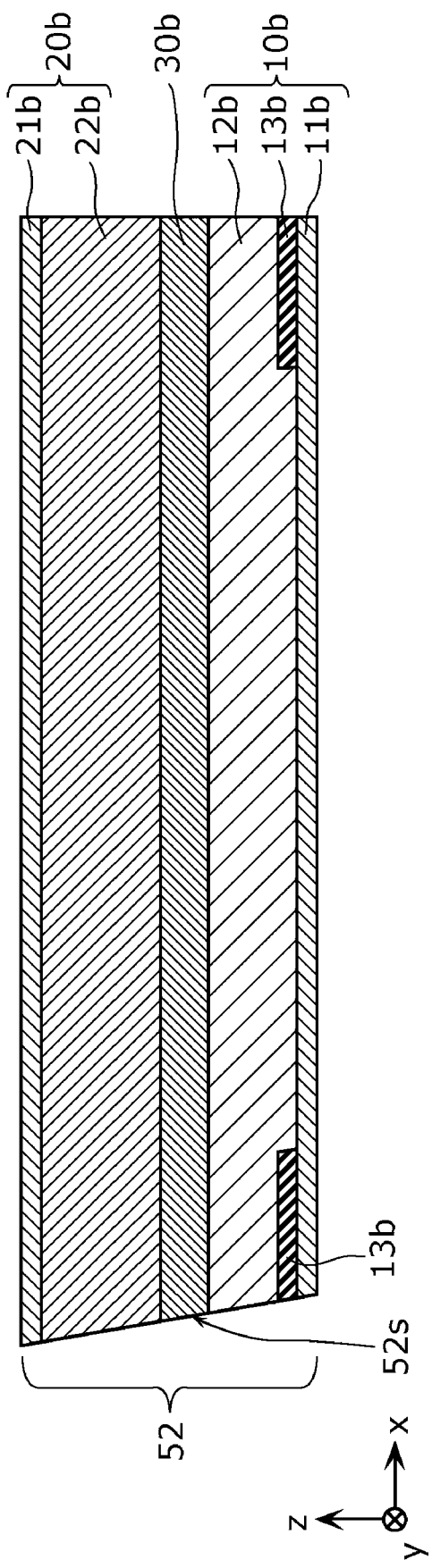
FIG. 10 is a schematic cross-sectional view showing another example of a battery according to Modification 1 of Embodiment 1.

FIG. 10 is a schematic cross-sectional view showing another example of a battery according to the present modification. As shown in FIG. 10, the battery 52 includes an electrode layer 10b, a counter-electrode layer 20b, and a solid electrolyte layer 30b. The electrode layer 10b has a collector 11b, an electrode active material layer 12b, and an insulating layer 13b. The counter-electrode layer 20b has a collector 21b and a counter-electrode active material layer 22b. In the battery 52, one side surface 52s is inclined in such a direction with respect to the laminating direction that the area of the counter-electrode layer 20b is larger than the area of the electrode layer 10b in plan view.

The batteries 51 and 52 are manufactured, for example, by cutting a battery 50 according to Embodiment 1 in a direction inclined with respect to the laminating direction. Further, the batteries 51 and 52 may also be manufactured by being cut in a direction inclined with respect to the laminating direction in the cutting step (c) of the method for manufacturing a battery 50. That is, the side surfaces 51s and 52s may be cut surfaces. In the case of the battery 51, the cut surfaces are trapezoidal, and in the case of the battery 52, the cut surfaces are rectangular.

Figure 11:
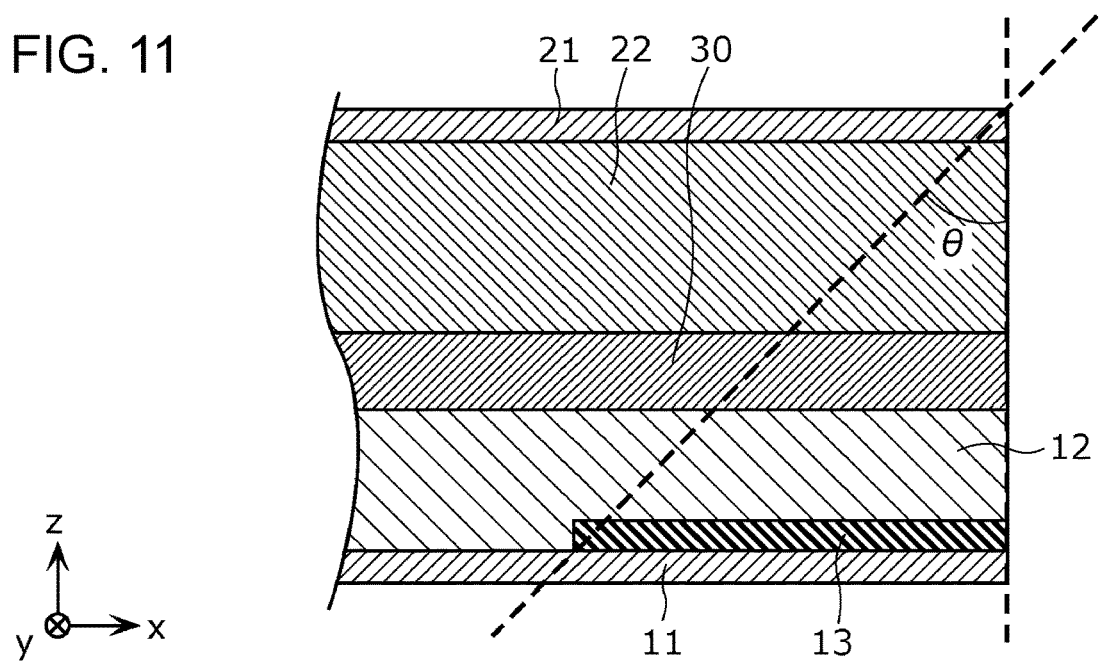
FIG. 11 is a diagram for explaining a cutting step (c) of a method for manufacturing a battery according to Modification 1 of Embodiment 1.

FIG. 11 is a diagram for explaining a cutting step (c) of a method for manufacturing a battery according to the present modification. As shown in FIG. 11, the batteries 51 and 52 are manufactured by being cut in a direction inclined at an angle θ with respect to the laminating direction in the aforementioned cutting step (c). The angle θ needs only be determined, for example, from the width of the insulating layer and the intended battery characteristics. The angle θ is for example smaller than 45 degrees. The angle θ may be smaller than or equal to 30 degrees. In a case where the angle θ is zero degree, the battery 50 is manufactured. For example, if the angle of a cut surface is larger than 45 degrees in a case where the thickness of a battery is 0.1 mm and the width of an insulating layer from a side surface of the battery is 0.1 mm, the insulating layer is removed by cutting, with the result that an effect of the insulating layer is not brought about.

Embodiment 2

Next, a battery according to Embodiment 2 is described. The battery according to Embodiment 2 is a laminated battery in which single cells are laminated. The following gives a description with a focus on differences from Example 1 described above, and omits or simplifies a description of common features.

Configuration

Figure 12:
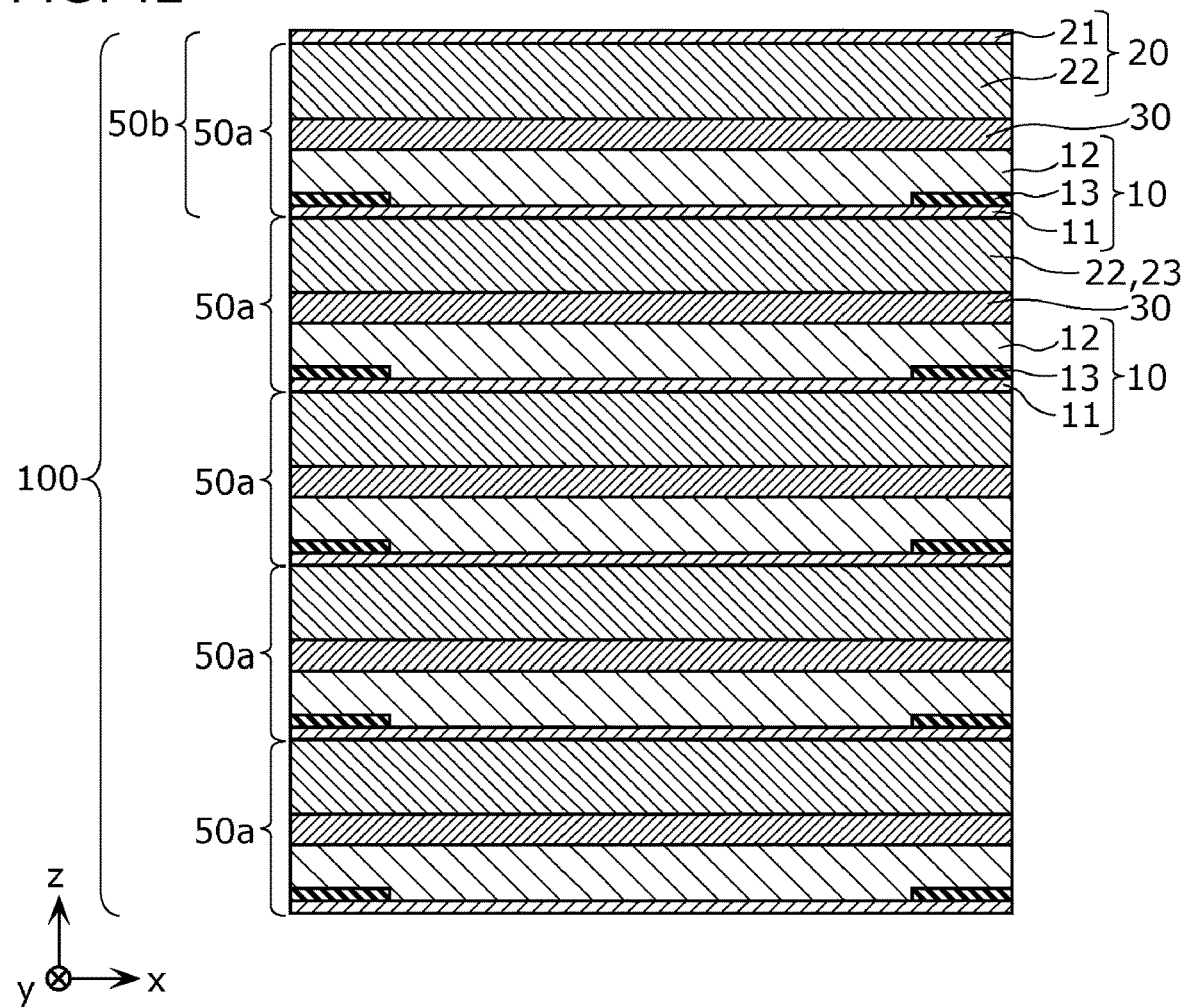
FIG. 12 is a schematic cross-sectional view showing an example of a battery according to Embodiment 2.

First, a configuration of a battery according to Embodiment 2 is described with reference to the drawings. FIG. 12 is a schematic cross-sectional view showing an example of a battery according to the present embodiment. As shown in FIG. 12, the battery 100 has a structure in which single cells structured not to have the collector 21 of the battery 50 according to Embodiment 1 are laminated.

The battery 100 includes a plurality of batteries 50a and a collector 21. The batteries 50a are each structured to include a counter-electrode layer 23 not having the collector 21 of the counter-electrode layer 20 in the battery 50. That is, the batteries 50a each include an electrode layer 10, a counter-electrode layer 23 placed opposite the electrode layer 10 and constituted by a counter-electrode active material layer 22, and a solid electrolyte layer 30 located between the electrode layer 10 and the counter-electrode layer 23.

In the battery 100, the plurality of batteries 50a are laminated such that the collector 11 of a first one of adjacent batteries 50a and the counter-electrode active material layer 22 of a second one of the adjacent batteries 50a face each other. This makes a structure in which the function of the collector 11 is shared by the adjacent batteries 50a. Further, the collector 21 is laminated on top of the counter-electrode active material layer 22 of the uppermost battery 50a. In this way, the battery 100 serves as a series-laminated battery. This makes it possible to achieve a series-laminated high-voltage battery 100 that exhibits an effect similar to that of the battery 50 according to Embodiment 1.

In the example shown in FIG. 12, the number of batteries 50a that are laminated is 5, but may be larger than or equal to 2 and smaller than or equal to 4 or may be larger than or equal to 6. The uppermost single cell, namely a battery 50b, is constituted by a battery 50a and the collector 21, and is identical in laminating configuration and shape to the battery 50 according to Embodiment 1.

Figure 13:
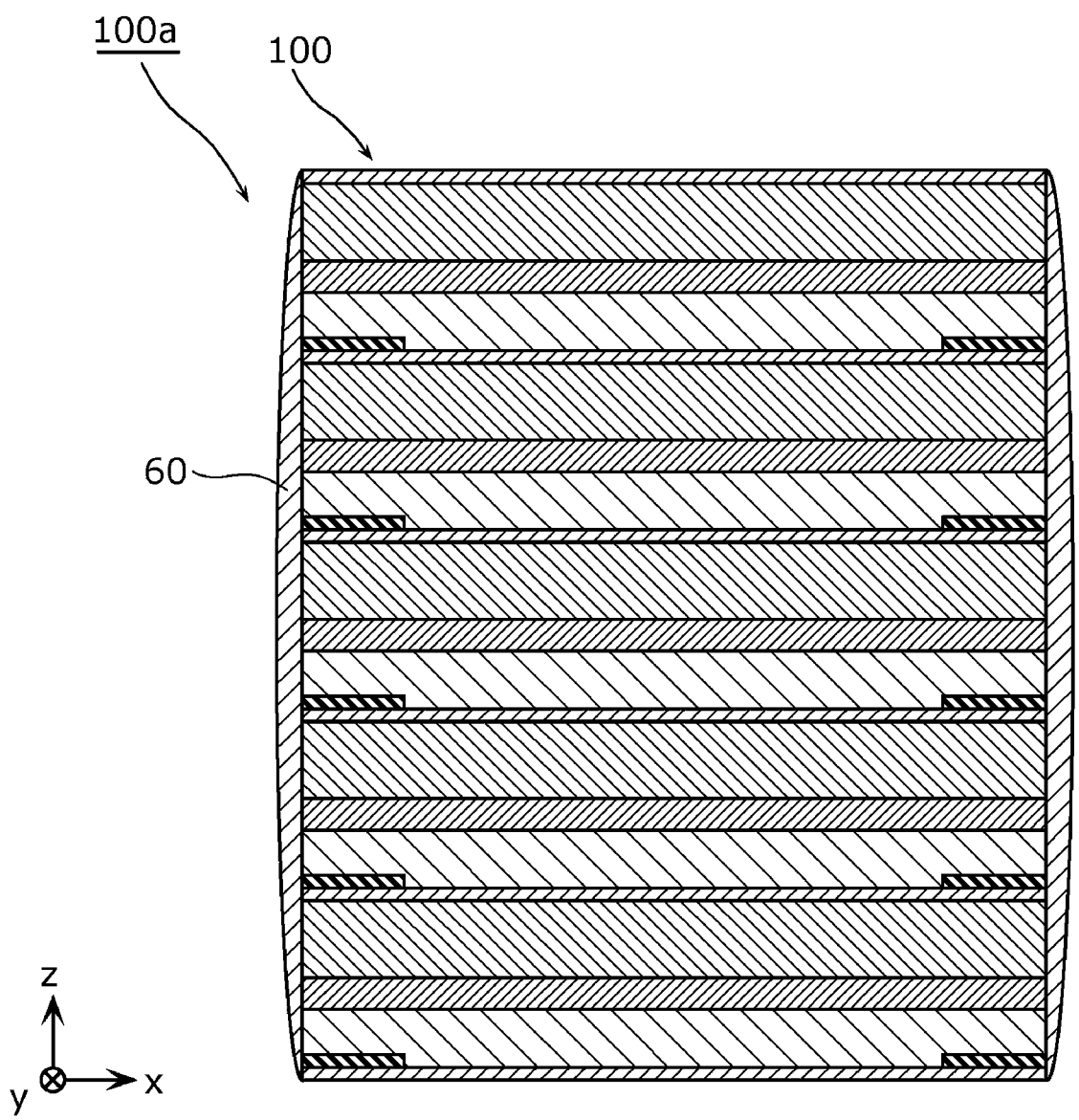
FIG. 13 is a schematic cross-sectional view showing another example of a battery according to Embodiment 2.

A side surface of the battery 100 is for example a cut surface. Further, the side surface of the battery 100 is a flat surface. In other words, side surfaces of the plurality of batteries 50a and the collector 21 are flush with one another. On the side surface of the battery 100, the layers may be exposed, and a sealing member or other members may be provided. FIG. 13 is a schematic cross-sectional view showing another example of a battery according to the present embodiment. As shown in FIG. 13, the battery 100a has a structure in which the side surface of the battery 100 is covered with a sealing member 60. That is, the side surfaces of the layers that constitute the battery 100a are covered with the sealing member 60. This prevents the side surfaces of the layers from being exposed, thus bringing about increase in strength of the battery 100a and improvement in reliability of the battery 100a.

The sealing member 60 of the battery 100a is formed by placing the battery 100 so that the side surface of the battery 100 faces upward and applying a sealing member to the side surface from above with a dispenser or other devices. As a material of the sealing member 60, a material of a sealing member for use in a publicly-known battery (e.g. a lithium-ion all-solid battery) may be used.

Manufacturing Method

The following describes a method for manufacturing a battery according to the present embodiment. It should be noted that the following method for manufacturing a battery 100 is just an example, and the method for manufacturing a battery 100 is not limited to the following example.

As is the case with the method for manufacturing a battery 50, the method for manufacturing a battery 100 includes an insulating layer laminating step (a), a power-generating element laminating step (b), a cutting step (c), and a collector laminating step (d). The following describes each of the steps in detail.

(1) Insulating Layer Laminating Step (a)

Figure 14:
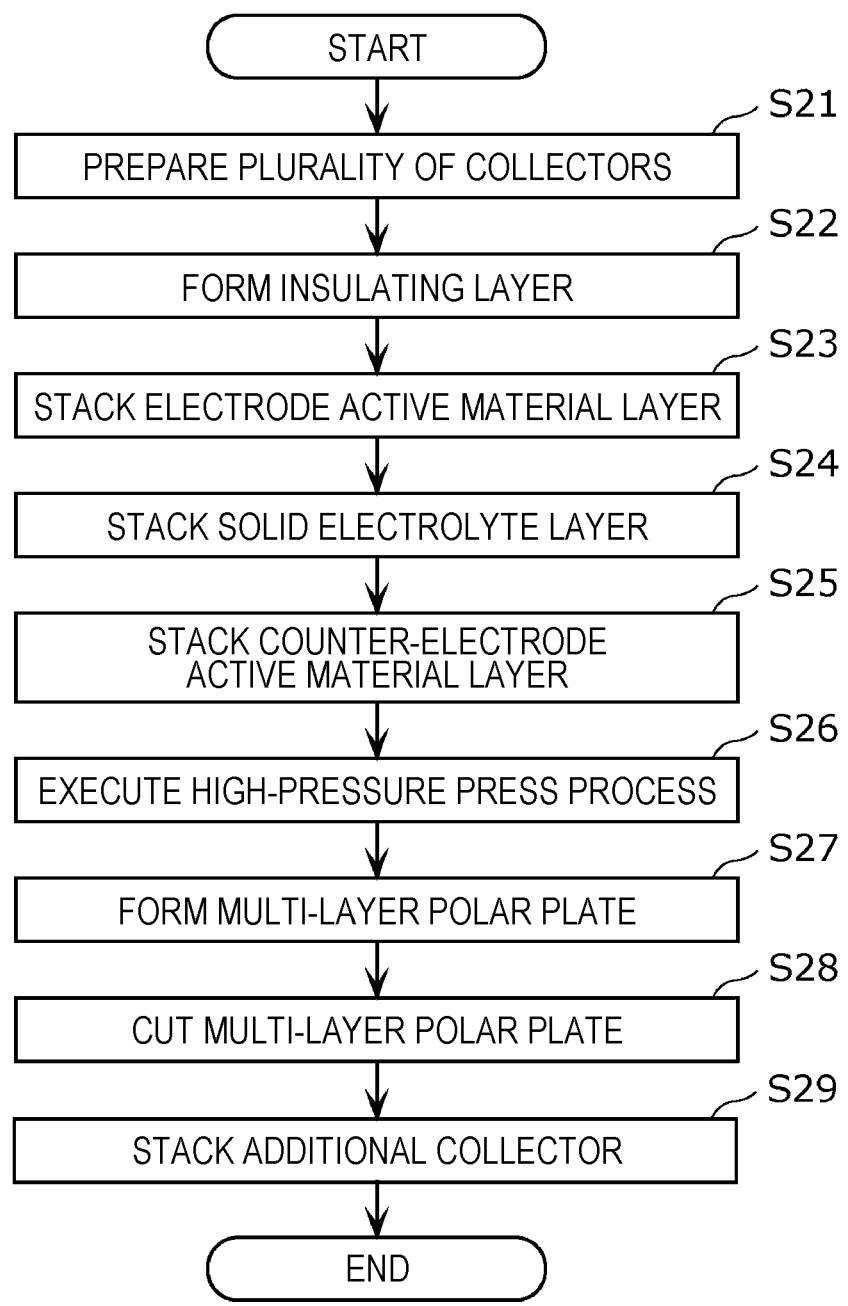
FIG. 14 is a flow chart for explaining a method for manufacturing a battery according to Embodiment 2.

First, the insulating layer laminating step (a) is described. FIG. 14 is a flow chart for explaining a method for manufacturing a battery according to the present embodiment.

In the insulating layer laminating step (a), first, a plurality of collectors 11 are prepared (step S21 of FIG. 14). Then, an insulating layer 13 is laminated only on one surface of each of the plurality of collectors 11 (step S22 of FIG. 14). Steps S21 and S22 may involve the use of methods which are similar to those used in the aforementioned steps S11 and S12. This gives a plurality of the collector 11 on which the insulating layer 13 is laminated, such as those shown in FIGS. 6A, 6B, and 6C.

(2) Power-Generating Element Laminating Step (b)

Next, the power-generating element laminating step (b) is described. In the manufacturing method according to the present embodiment, the power-generating element laminating step (b) includes a first laminated body forming step (ba) and a first laminated body laminating step (bb). In the first laminated body forming step (ba), a plurality of laminated polar plates (e.g. laminated polar plates 41, 41a, or 41b shown in FIGS. 7A, 7B, and 7C) are formed by laminating a power-generating element 40 on each of the plurality of collectors 11 on which the insulating layer 13 is laminated such that the electrode active material layer 12 covers the insulating layer 13. The laminated polar plates 41, 41a, and 41b are examples of first laminated bodies. Specifically, an electrode active material layer 12, a solid electrolyte layer 30, and a counter-electrode active material layer 22 are laminated in this order on top of each other over each of the plurality of collectors 11 on which the insulating layer 13 is laminated (steps S23, S24, and S25 of FIG. 14). Furthermore, if necessary, a high-pressure press process is performed on each of the electrode active material layer 12, the solid electrolyte layer 30, and the counter-electrode active material layer 22, which were laminated in steps S23, S24, and S25 (step S26 of FIG. 14). Further, if necessary, a heat treatment is performed on each of the electrode active material layer 12, the solid electrolyte layer 30, and the counter-electrode active material layer 22, which were laminated in steps S23, S24, and S25. Steps S23, S24, S25, and S26 may involve the use of methods which are similar to those used in the aforementioned steps S13, S14, S15, and S16.

Figure 15:
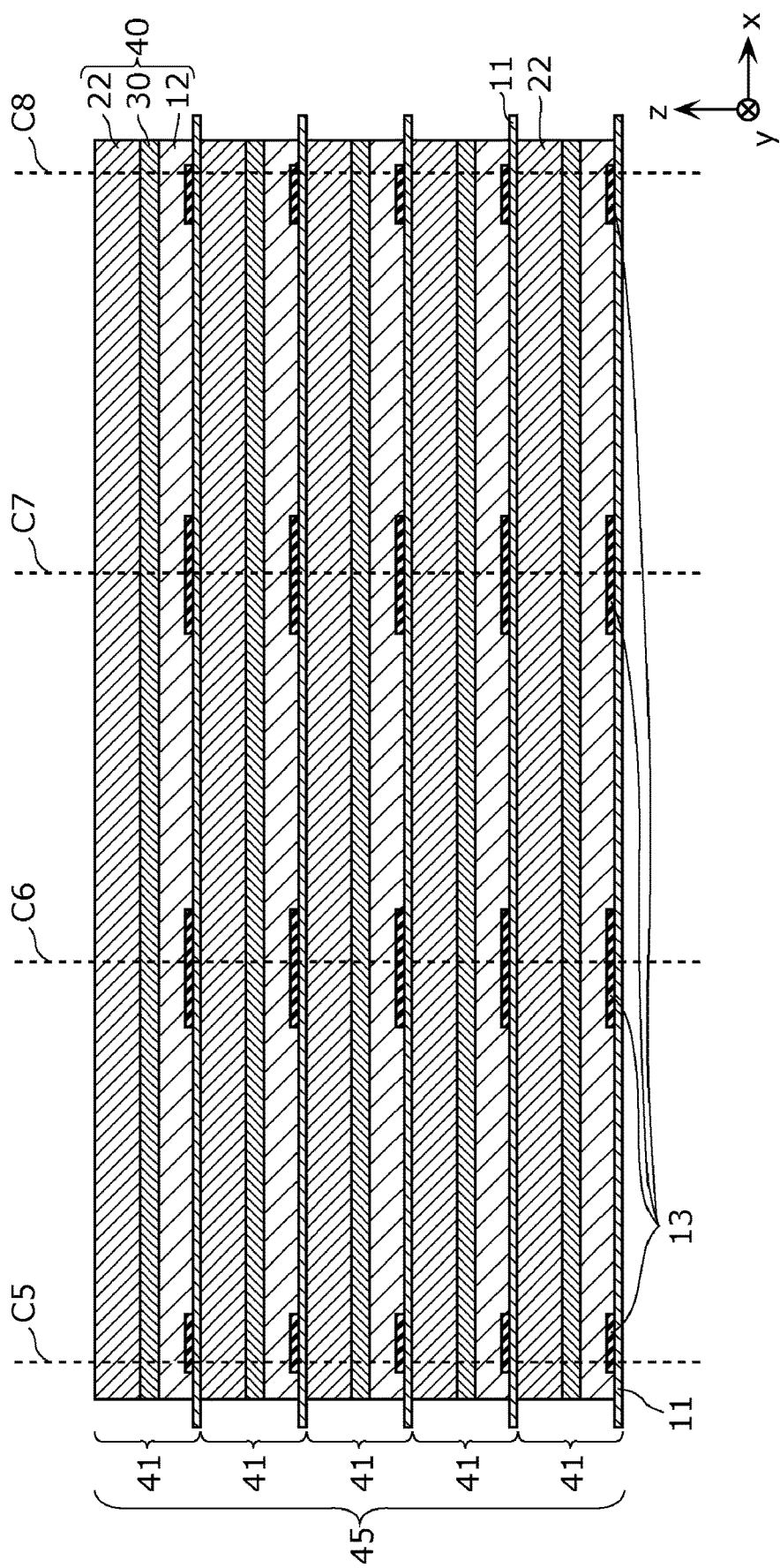
FIG. 15 is a schematic cross-sectional view showing an example of a multi-layer polar plate according to Embodiment 2.

Next, in the first laminated body laminating step (bb), the plurality of laminated polar plates formed in the first laminated body forming step (ba) are laminated such that the positions of the insulating layer 13 of the laminated polar plates overlap each other in plan view (step S27 of FIG. 14). This forms a multi-layer polar plate in which the plurality of laminated polar plates are laminated. FIG. 15 is a schematic cross-sectional view showing an example of a multi-layer polar plate according to the present embodiment. FIG. 15 shows a multi-layer polar plate 45 in which laminated polar plates 41 are laminated. As shown in FIG. 15, in the first laminated body laminating step (bb), the plurality of laminated polar plates 41 are laminated such that the counter-electrode active material layer 22 of a first one of adjacent laminated polar plates 41 faces the collector 11 of a second one of the adjacent laminated polar plates 41. For example, by performing a press process for pressing, from both sides in the laminating direction, the plurality of laminated polar plates 41, the plurality of laminated polar plates 41 are bonded to one another to form the multiple-layer polar plate 45. In the multi-layer polar plate 45, the collector 11 of an upper one of adjacent laminated polar plates 41 and the counter-electrode active material layer 22 of a lower one of the adjacent laminated plates 41 are in contact with each other.

In a case where the electrode active material layers 12, the solid electrolyte layers 30, and the counter-electrode active material layers 22 have been subjected to a high-pressure press process in forming the laminated polar plates 41, a high-pressure press is not needed in a press process in forming the multi-layer polar plate 45. For example, the pressure of the press process for bonding the laminated polar plates 41 to one another in step S27 is lower than the pressure of the high-pressure press process in step S26. This makes it possible to form the multi-layer polar plate 45 without fracturing interfaces formed in the first laminated body forming step (ba).

(3) Cutting Step (c) and Collector Laminating Step (d)

Next, the cutting step (c) and the collector laminating step (d) are described. In the cutting step (c), the multi-layer polar plate 45, i.e. a collector 11 on which a power-generating element 40 is laminated in the power-generating element laminating step (b), is cut in the laminating direction at a position where the insulating layers 13 are divided (step S28 of FIG. 14). As shown in FIG. 15, the multi-layer polar plate 45 is cut with a blade, laser light, or other devices, for example, at the positions of dashed lines C5, C6, C7, and C8 where the insulating layers 13 are disposed. At the positions of the dashed lines C5, C6, C7, and C8, the plurality of laminated polar plates 41 are laminated, and they are collectively cut. Thus, cutting collectively the plurality of laminated polar plates 41 makes it unnecessary to manufacture and laminate single cells in shapes into which they have been cut, thus significantly reducing the number of times the power-generating elements 40 are laminated in the power-generating element laminating step (b). This makes it possible to efficiently manufacture a laminated battery.

Next, in the collector laminating step (d), after the multi-layer polar plate 45 has been cut in the cutting step (c), a collector 21 is laminated as an additional collector on a surface of a power-generating element 40 of the multi-layer polar plate 45 that is opposite to a collector 11 (step S29 of FIG. 14). Specifically, in the multi-layer polar plate 45 thus cut, the collector 21 is bonded by a press process or other processes to a surface of the power-generating element 40 of a laminated polar plate 41 that is opposite to the collector 11. This laminated polar plate 41 is one of the plurality of laminated polar plates 41 whose power-generating element 40 has a surface that is opposite to the collector 11 and on which another laminated polar plate 41 is not laminated. In the example shown in FIG. 15, the collector 21 is bonded on top of the counter-electrode active material layer 22, whose upper surface is exposed, of the uppermost laminated polar plate 41. This gives a battery 100 shown in FIG. 12.

It should be noted that the cutting step (c) and the collector laminating step (d) may be transposed. That is, before the multi-layer polar plate 45 is cut in the cutting step (c), the collector 21 may be laminated first on a surface of the power-generating element 40 that is opposite to a collector 11, and then the multi-layer polar plate 45 on wchi the collector 21 is laminated may be cut in the laminating direction at the position where the insulating layers 13 are divided.

Thus, using the method for manufacturing a battery according to the present embodiment makes it possible to manufacture a series-laminated high-voltage battery 100.

Modification 1

The following describes Modification 1 of Embodiment 2. The following describes Modification 1 of Embodiment 2 with a focus on differences from Embodiments 1 and 2, and omits or simplifies a description of common features.

A method for manufacturing a battery according to the present modification is described. The method for manufacturing a battery according to the present modification differs from the method for manufacturing a battery according to Embodiment 2 in that instead of a laminated polar plate 41, a laminated polar plate 42 is formed by laminating a power-generating element 40 on a surface of a collector 11 on which an insulating layer 13 is not laminated.

In the method for manufacturing a battery according to the present modification, the insulating layer laminating step (a) is identical to the insulating layer laminating step (a) (steps S21 and S22 of FIG. 14) according to Embodiment 2.

Figure 16:
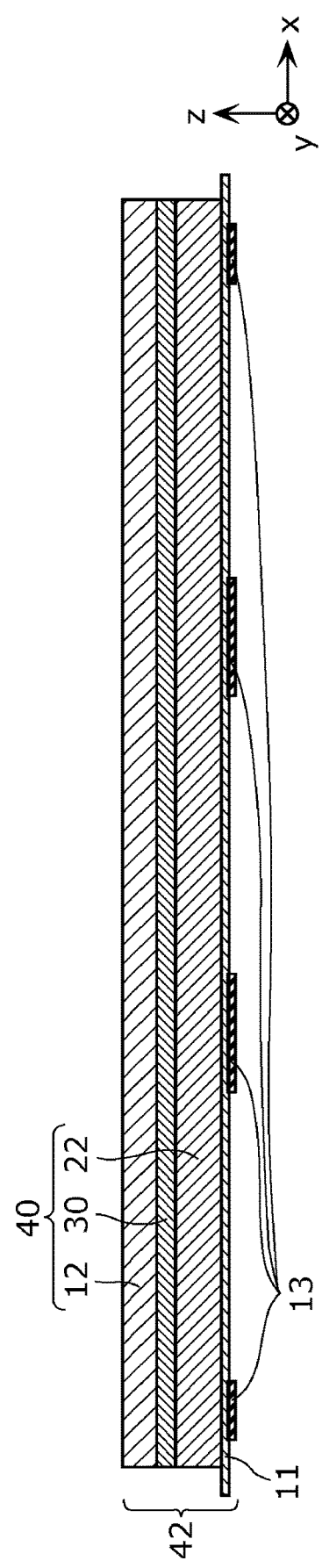
FIG. 16 is a schematic cross-sectional view showing an example of a laminated polar plate according to Modification 1 of Embodiment 2.

The power-generating element laminating step (b) according to the present modification includes a second laminated body forming step (bc) and a second laminated body laminating step (bd). FIG. 16 is a schematic cross-sectional view showing an example of a laminated polar plate according to the present modification. As shown in FIG. 16, in the second laminated body forming step (bc), a plurality of laminated polar plates 42 is formed by laminating a power-generating element 40 on each of the plurality of collectors 11 on which the insulating layer 13 is laminated such that the counter-electrode active material layer 22 and a surface of the collector 11 on which the insulating layer 13 is not laminated face each other. The laminated polar plates 42 are examples of second laminated bodies. Specifically, the laminated polar plates 42 are each formed by laminating a counter-electrode active material layer 22, a solid electrolyte layer 30, and an electrode active material layer 12 in this order on top of each other over the surface of the collector 11 on which the insulating layer 13 is not laminated. The laminating of the counter-electrode active material layer 22, the solid electrolyte layer 30, and the electrode active material layer 12 may involve the use of methods which are similar to those used in the aforementioned steps S15, S14, and S13. Furthermore, if necessary, a high-pressure press process is performed on each of the counter-electrode active material layer 22, the solid electrolyte layer 30, and the electrode active material layer 12. The high-pressure press process may involve the use of a method which is similar to that used in the aforementioned step S16. Further, if necessary, a heat treatment is performed on each of the counter-electrode active material layer 22, the solid electrolyte layer 30, and the electrode active material layer 12 which are laminated.

Figure 17:
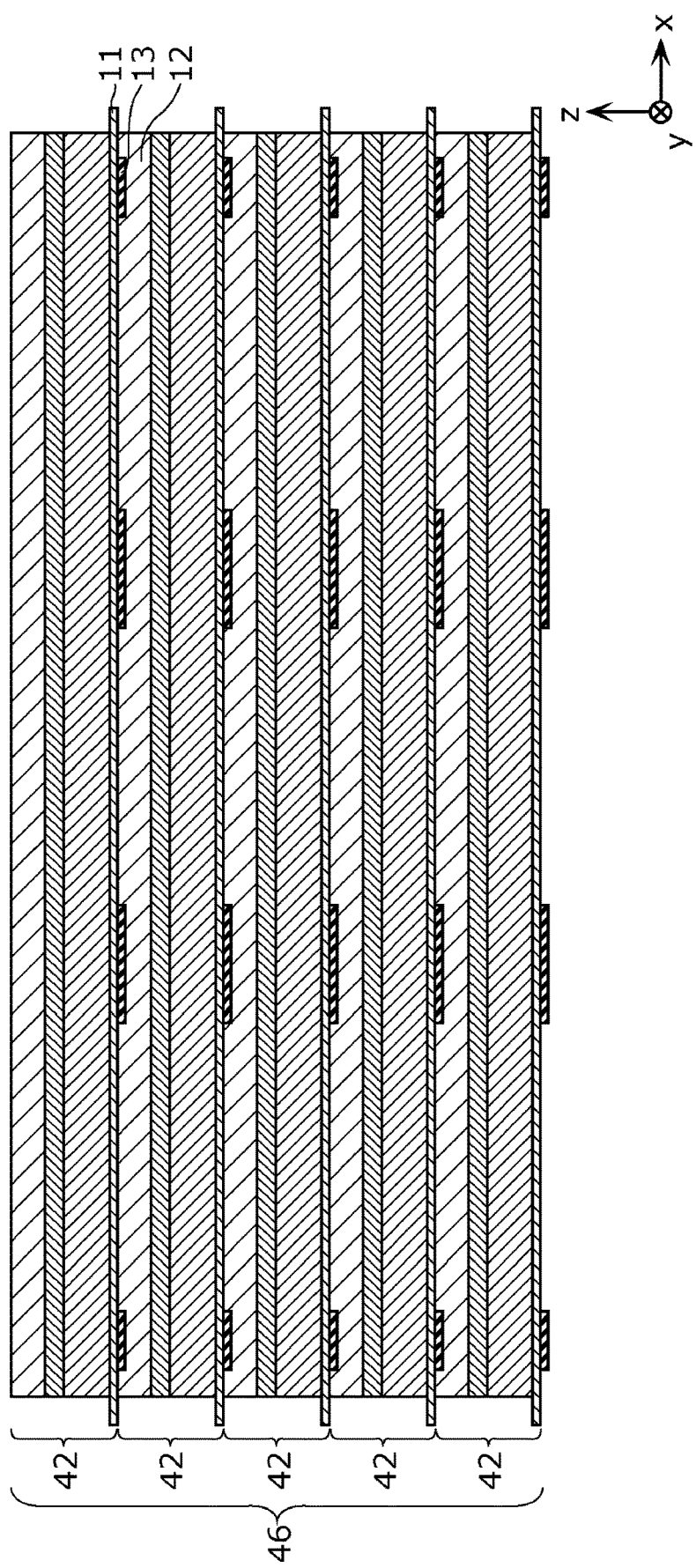
FIG. 17 is a schematic cross-sectional view showing an example of a multi-layer polar plate according to Modification 1 of Embodiment 2.

Next, in the second laminated body laminating step (bd), the plurality of laminated polar plates 42 formed in the second laminated body forming step (bc) are laminated such that positions of the insulating layers 13 of the laminated polar plates 42 overlap each other in plan view. FIG. 17 is a schematic cross-sectional view showing an example of a multi-layer polar plate according to the present modification. As shown in FIG. 17, in the second laminated body laminating step (bd), the plurality of laminated polar plates 42 are laminated such that the electrode active material layer 12 of a first one of adjacent laminated polar plates 42 covers the insulating layer 13 of a second one of the adjacent laminated polar plates 42. For example, by performing a press process for pressing, from both sides in the laminating direction, the plurality of laminated polar plates 42, the plurality of laminated polar plates 42 are bonded to one another to form a multiple-layer polar plate 46. In the multi-layer polar plate 46, the collector 11 and the insulating layer 13 of an upper one of adjacent laminated polar plates 42 and the electrode active material layer 12 of a lower one of the adjacent laminated plates 42 are in contact with each other. Thus, in the multiple-layer polar plate 46, a covering structure is formed in which the electrode active material layer 12 of a lower one of adjacent laminated polar plates 42 covers the insulating layer 13 of an upper one of the adjacent laminated polar plates 42.

Figure 18:
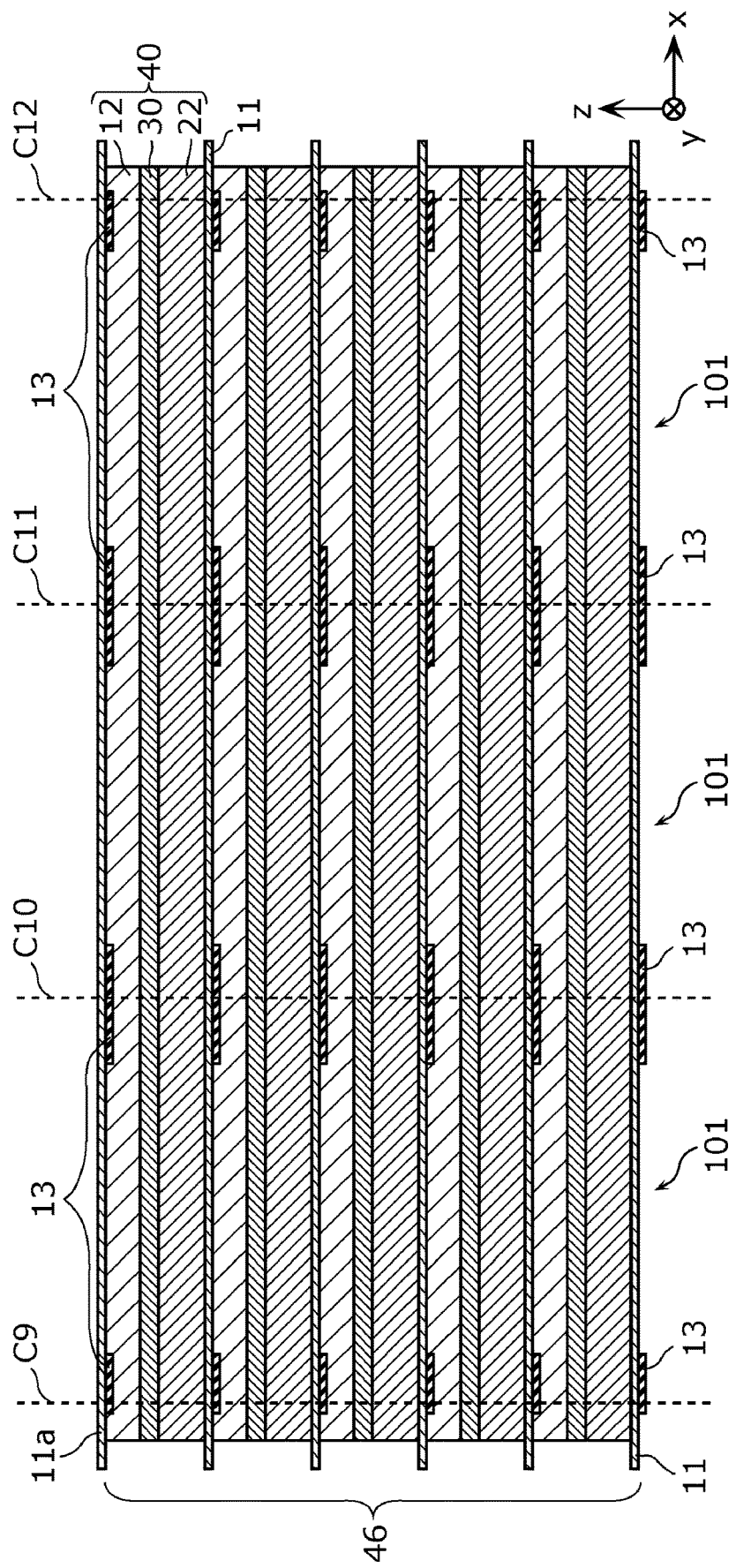
FIG. 18 is a diagram for explaining a collector laminating step (d) and a cutting step (c) of a method for manufacturing a battery according to Modification 1 of Embodiment 2.

Next, the collector laminating step (d) and the cutting step (c) are executed. FIG. 18 is a diagram for explaining the collector laminating step (d) and the cutting step (c) of the method for manufacturing a battery according to the present modification. As shown in FIG. 18, a collector 11a with an insulating layer 13 laminated thereon is laminated as an additional collector on the multi-layer polar plate 46. The collector 11a on which the insulating layer 13 is laminated is identical in shape and material to the collectors 11 on which the insulating layers 13 is laminated in the insulating layer laminating step (a). As shown in FIG. 18, the multi-layer polar plate 46 and the collector 11a on which the insulating layer 13 is laminated are laminated such that an electrode active material layer 12 of the multi-polar plate 46 covers the insulating layer 13 laminated on the collector 11a. Further, the multi-layer polar plate 46 and the collector 11a on which the insulating layer 13 is laminated are laminated such that positions of the insulating layers 13 of the laminated polar plates 42 overlap each other in plan view. Specifically, in the multi-layer polar plate 46, the collector 11a on which the insulating layer 13 is laminated is bonded by a press process or other processes to a surface of the power-generating element 40 of a laminated polar plate 42 that is opposite to the collector 11. This laminated polar plate 42 is one of the plurality of laminated polar plates 42 whose power-generating element 40 has a surface that is opposite to the collector 11 and on which another laminated polar plate 42 is not laminated.

Next, in the cutting step (c), the multi-layer polar plate 46, i.e. a collector 11 on which a power-generating element 40 is laminated in the power-generating element laminating step (b), is cut in the laminating direction at a position where the insulating layers 13 are divided. Specifically, as shown in FIG. 18, the multi-layer polar plate 46 is cut with a blade, laser light, or other devices, for example, at the positions of dashed lines C9, C10, C11, and C12 where the insulating layers 13 are disposed. At the positions of the dashed lines C9, C10, C11, and C12, the plurality of laminated polar plates 42 are laminated, and they are collectively cut. This gives a laminated battery 101 in which a plurality of single cells are laminated. The battery 101 is a series-laminated high-voltage battery as is the case with the battery 100. In the battery 101, the insulating layer 13 laminated on the collector 11 located at the uppermost or lowermost position in the laminating direction is exposed.

It should be noted that the cutting step (c) and the collector laminating step (d) may be transposed.

Thus, using the method for manufacturing a battery according to the present modification makes it possible to manufacture a series-laminated high-voltage battery 101.

Modification 2

The following describes Modification 2 of Embodiment 2. The following describes Modification 2 of Embodiment 2 with a focus on differences from Embodiments 1 and 2, and omits or simplifies a description of common features.

A method for manufacturing a battery according to the present modification is described. The method for manufacturing a battery according to the present modification differs from the method for manufacturing a battery according to Embodiment 2 in that power-generating elements 40 are laminated on both surfaces, respectively, of a collector 11 on both surfaces, respectively, of which insulating layers 13 are laminated.

First, in the insulating layer laminating step (a), insulating layers 13 are laminated on both surfaces, respectively, of a collector 11. The insulating layers 13 laminated on both surfaces are identical in position to each other in plan view. The method for laminating the insulating layers 13 on the collector 11 may involve the use of methods which are similar to those used in the aforementioned steps S11 and S12. For example, an insulating layer 13 is laminated on a surface of a collector 11 on which an insulating layer 13 is not laminated, such as that shown in FIGS. 6A, 6B, and 6C.

Figure 19:
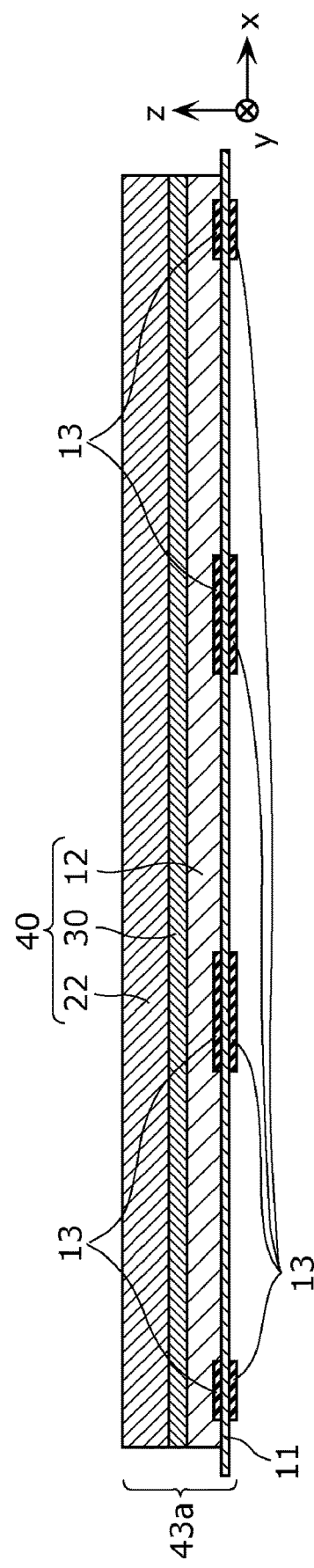
FIG. 19 is a schematic cross-sectional view showing an example of a laminated polar plate according to Modification 2 of Embodiment 2 having an insulating layer.
Figure 20:
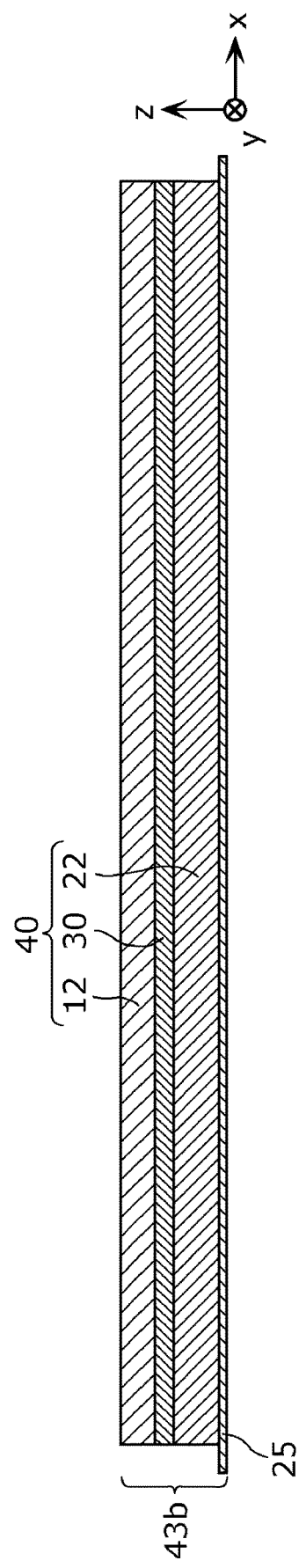
FIG. 20 is a schematic cross-sectional view showing an example of a laminated polar plate according to Modification 2 of Embodiment 2 having no insulating layer.
Figure 21:
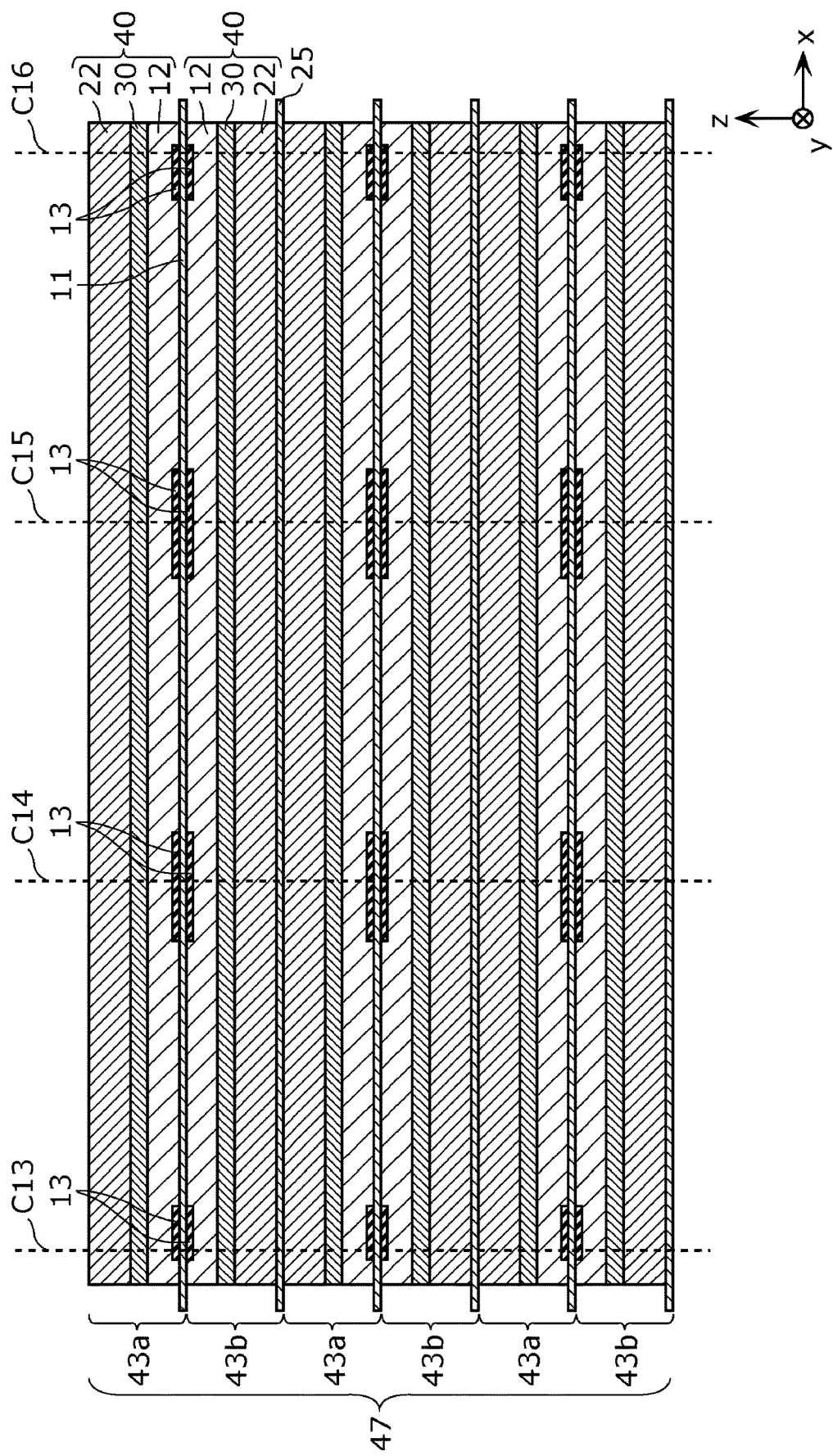
FIG. 21 is a schematic cross-sectional view showing an example of a multi-layer polar plate according to Modification 2 of Embodiment 2.

Next, the power-generating element laminating step (b) is executed. FIG. 19 is a schematic cross-sectional view showing an example of a laminated polar plate according to the present modification having an insulating layer. FIG. 20 is a schematic cross-sectional view showing an example of a laminated polar plate according to the present modification having no insulating layer. FIG. 21 is a schematic cross-sectional view showing an example of a multi-layer polar plate according to the present modification. In the power-generating element laminating step (b) according to the present modification, for example, a laminated polar plate 43a having an insulating layer 13 as shown in FIG. 19 and a laminated polar plate 43b having no insulating layer 13 as shown in FIG. 20 are formed. The laminated polar plate 43a is formed by overlaying an electrode active material layer 12, a solid electrolyte layer 30, and a counter-electrode active material layer 22 in this order over one surface of a collector 11 on both surfaces, respectively, of which insulating layers 13 are laminated. That is, a power-generating element 40 is laminated on one surface of a collector 11 on both surfaces, respectively, of which insulating layers 13 are laminated such that the electrode active material layer 12 of the power-generating element 40 covers an insulating layer 13. In the laminated polar plate 43a, a covering structure is formed in which the electrode active material layer 12 covers the insulating layer 13.

Further, the laminated polar plate 43b is formed, for example, by preparing a collector 25 that is identical in shape to the collector 11 in plan view and overlaying a counter-electrode active material layer 22, a solid electrolyte layer 30, and an electrode active material layer 12 in this order over one surface of the collector 25. That is, a power-generating element 40 is laminated on one surface of the collector 25 such that the counter-electrode active material layer 22 of the power-generating element 40 faces the collector 25. The collector 25 is an example of a third collector.

The laminating of the power-generating element 40 of each of the laminated polar plates 43a and 43b may involve the use of methods which are similar to those used in the aforementioned steps S13, S14, and S15. Furthermore, if necessary, a high-pressure press process is performed on each of the electrode active material layer 12, the solid electrolyte layer 30, and the counter-electrode active material layer 22. Further, if necessary, a heat treatment is performed on each of the electrode active material layer 12, the solid electrolyte layer 30, and the counter-electrode active material layer 22.

Next, as shown in FIG. 21, a multi-layer polar plate 47 is formed by alternately laminating laminated polar plates 43a and 43b such that the electrode active material layer 12 of a laminated polar plate 43b covers an insulating layer 13 of a laminated polar plate 43a. In the formation of the multi-layer laminated polar plate 47, the laminated polar plates 43a and 43b are alternately laminated such that positions of the insulating layers 13 of a plurality of the laminated polar plates 43a overlap each other in plan view. The laminated polar plates 43a and 43b are pressed from both sides in the laminating direction by a press process, whereby the laminated polar plates 43a and 43b are bonded together to form the multi-layer laminated polar plate 47.

Figure 22:
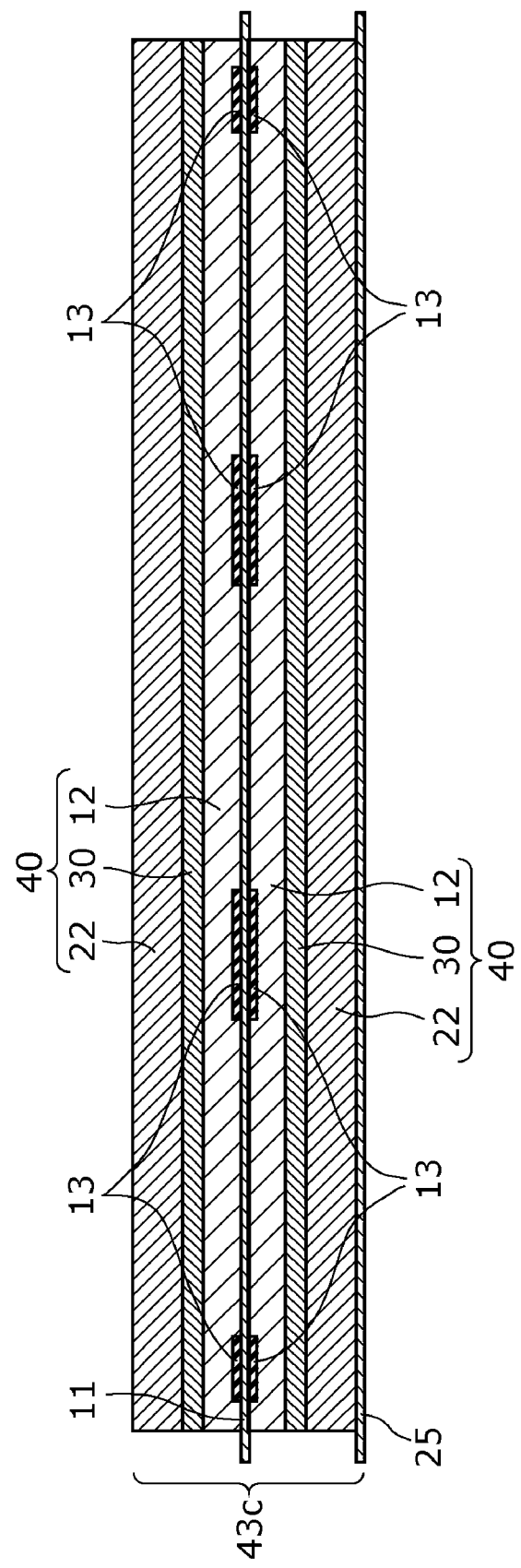
FIG. 22 is a schematic cross-sectional view showing another example of a multi-layer polar plate according to Modification 2 of Embodiment 2.

FIG. 22 is a schematic cross-sectional view showing another example of a multi-layer polar plate according to the present modification. For example, instead of forming laminated polar plates 43a and 43b, a laminated polar plate 43c shown in FIG. 22 may be formed. First, electrode active material layers 12, solid electrolyte layers 30, and counter-electrode active material layers 22 are overlaid in this order over both surfaces, respectively, of a collector 11 on both surfaces, respectively, of which insulating layers 13 are laminated such that the electrode active layers 12 cover the insulating layers 13, whereby a laminated body is formed in which power-generating elements 40 are laminated on both surfaces, respectively, of the collector 11. In the laminating of the electrode active material layers 12, the solid electrolyte layers 30, and the counter-electrode active material layers 22, the layers may be sequentially overlaid separately for each one surface of the collector 11, or layers of the same type may be simultaneously overlaid on both surfaces, respectively, of the collector 11. The laminated polar plate 43c is formed by laminating the resulting laminated body on a collector 25. It should be noted that the laminated polar plate 43c is structured such that one laminated polar plate 43a and one laminated polar plate 43b are laminated, and may be formed by laminating one laminated polar plate 43a and one laminated polar plate 43b. Next, a multi-layer polar plate 47 is formed by laminating a plurality of the laminated polar plates 43c.

The multi-layer polar plate 47 has a structure in which a collector 11 on which insulating layers 13 is laminated, two power-generating elements 40, and a collector 25 are laminated. Further, the multi-layer polar plate 47 has a structure in which the collector 11 is sandwiched between the two power-generating elements 40 so as for the electrode active material layers 12 to cover the insulating layers 13 laminated on both surfaces, respectively, of the collector 11 and such that a first one of the two power-generating elements 40 is sandwiched between the collector 11 on which the insulating layers 13 is laminated and the collector 25. As will be mentioned in detail later, a collector 21 is laminated on a side of a second one of the two uppermost power-generating elements 40 that is opposite to the collector 11.

Although, in the present modification, the multi-layer polar plate 47 has three sets of laminated polar plates 43a and 43b that are alternately laminated, the multi-layer polar plate 47 may be one or two sets or may have four or more sets. In a case where the multi-layer polar plate 47 is constituted by one set of laminated polar plates 43a and 43b, the multi-layer polar plate 47 is identical in configuration to the laminated polar plate 43c.

Next, the cutting step (c) is executed. In the cutting step (c), the multi-layer polar plate 47, i.e. a collector 11 on which two power-generating elements 40 and a collector 25 are laminated in the power-generating element laminating step (b), is cut in the laminating direction at a position where the insulating layers 13 are divided. As shown in FIG. 21, the multi-layer polar plate 47 is cut with a blade, laser light, or other devices, for example, at the positions of dashed lines C13, C14, C15, and C16 where the insulating layers 13 are disposed. At the positions of the dashed lines C13, C14, C15, and C16, the plurality of laminated polar plates 43a and the plurality of laminated polar plates 43b are laminated, and they are collectively cut.

Figure 23:
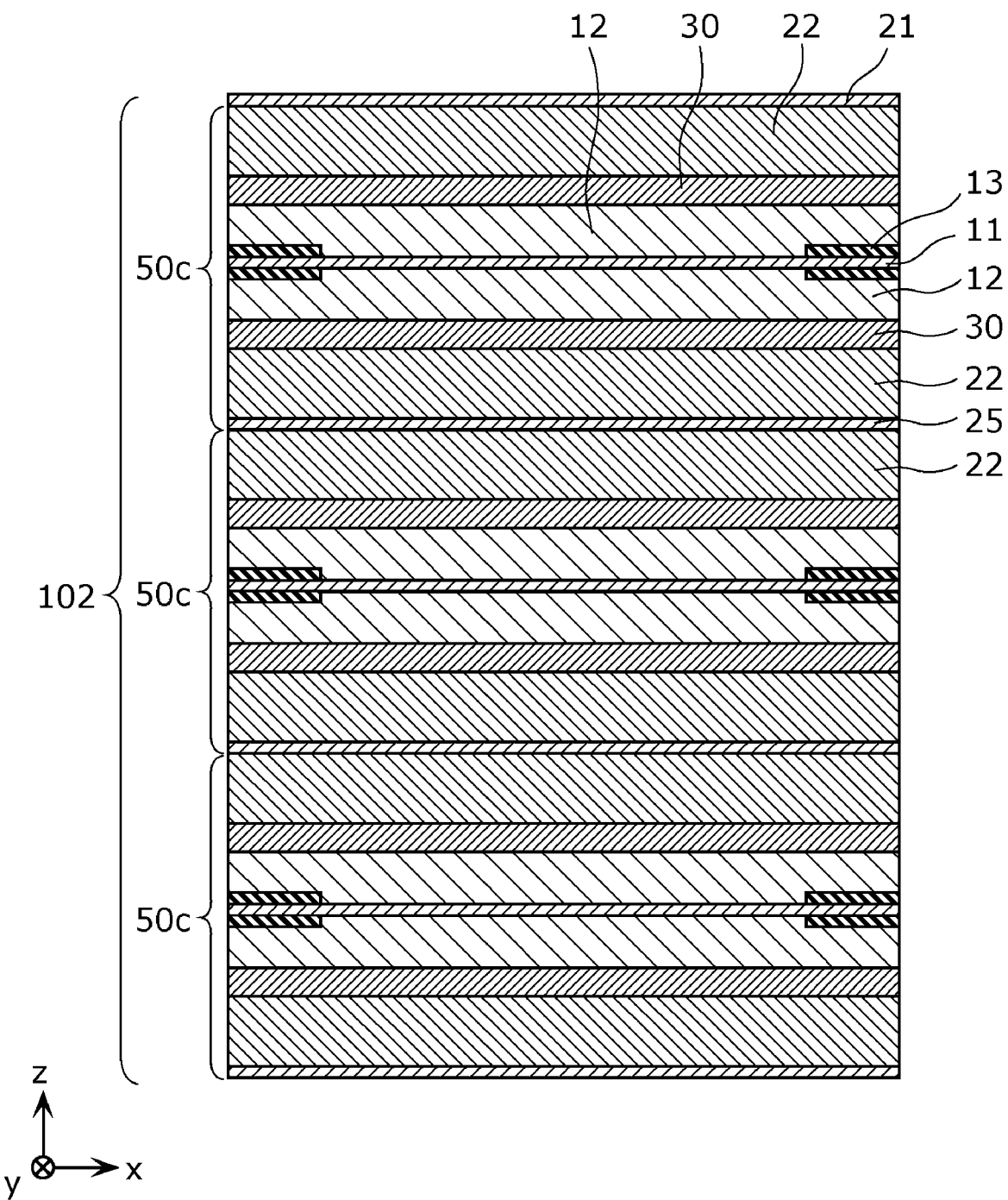
FIG. 23 is a schematic cross-sectional view showing an example of a battery according to Modification 2 of Embodiment 2.

Next, the collector laminating step (d) is executed. In the collector laminating step (d), after the multi-layer polar plate 47 has been cut in the cutting step (c), a collector 21 is laminated as an additional collector on a surface of a power-generating element 40 of the multi-layer polar plate 47 on which a collector 11 is not laminated. Specifically, in the multi-layer polar plate 47 thus cut, the collector 21 is bonded by a press process or other processes to a surface of the power-generating element 40 of a laminated polar plate 43a that is opposite to the collector 11. This laminated polar plate 43a is one of the plurality of laminated polar plates 43a whose power-generating element 40 has a surface that is opposite to the collector 11 and on which a laminated polar plate 43b is not laminated. FIG. 23 is a schematic cross-sectional view showing an example of a battery according to the present modification. A battery 102 shown in FIG. 23 is obtained through such a collector laminating step (d).

It should be noted that the cutting step (c) and the collector laminating step (d) may be transposed.

As shown in FIG. 23, the battery 102 includes a plurality of batteries 50c and a collector 21. The batteries 50c each include a collector 25, two counter-electrode active material layers 22 located above the collector 25 and placed opposite each other, two solid electrolyte layers 30 located between the two counter-electrode active material layers 22 and placed opposite each other, two electrode active material layers 12 located between the two solid electrolyte layers 30 and placed opposite each other, a collector 11 located between the two electrode active material layers 12, and an insulating layer 13 located between the collector 11 and each of the two electrode active material layers 12 and laminated at ends of the collector 11 in plan view.

In the battery 102, the plurality of batteries 50c is laminated such that the collector 25 of a first one of adjacent batteries 50c and a counter-electrode active material layer 22 of a second one of the adjacent batteries 50c face each other. This results in a structure in which the function of the collector 25 is shared by the adjacent batteries 50c. Further, the collector 21 is laminated on top of a counter-electrode active material layer 22 of the uppermost battery 50c. The battery 102 has a structure in which electrode active material layers 12 are laminated on both surfaces, respectively, of a collector 11 and counter-electrode active material layers 22 are laminated on both surfaces, respectively, of a collector 25. In this way, the battery 102 serves as a parallel-laminated battery. For the purpose of taking out an electric current, the collector 21 and the collectors 25 are electrically connected to each other through leads or other wires, and the collectors 11 are electrically connected to one another through leads or other wires, whereby the battery 102 functions as a parallel-laminated battery. Although, in the example shown in FIG. 23, the number of batteries 50c that are laminated is 3, the number may be larger than or equal to 1 and smaller than or equal to 2 or may be larger than or equal to 4.

A portion constituted by the collector 21, which is located above the uppermost battery 50c, and the upper counter-electrode active material layer 22, upper solid electrolyte layer 30, upper electrode active material layer 12, upper insulating layer 13, and collector 11 of the uppermost battery 50c is identical in laminating configuration and shape to the battery 50 according to Embodiment 1.

Figure 24:
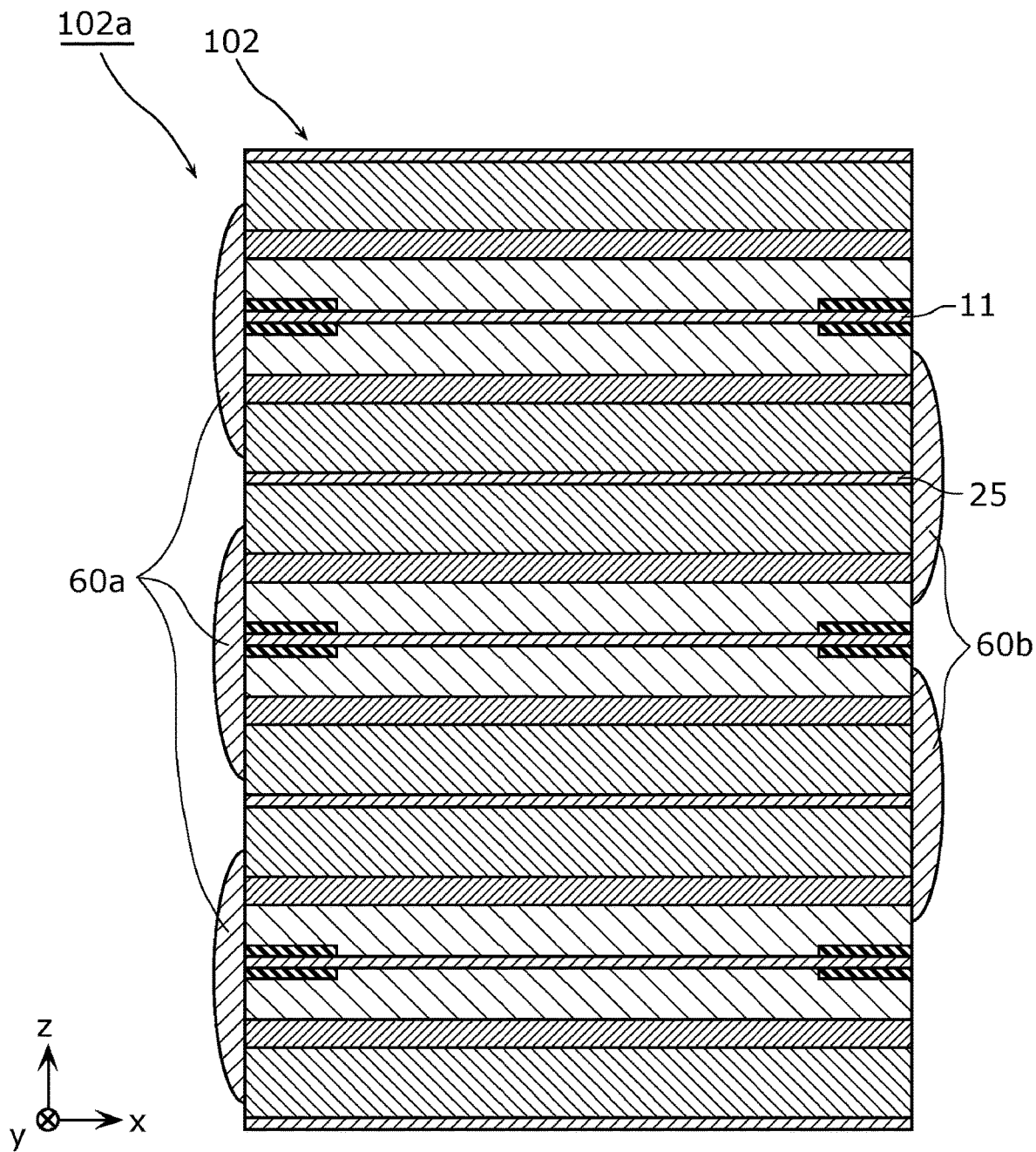
FIG. 24 is a schematic cross-sectional view showing another example of a battery according to Modification 2 of Embodiment 2.

A side surface of the battery 102 is a cut surface formed by the aforementioned manufacturing method. Further, side surfaces of the plurality of batteries 50c and the collector 21 are flush with one another. That is, one flat surface is formed as a side surface of the battery 102. On a side surface of the battery 102, the layers may be exposed, or a sealing member or other members may be provided. FIG. 24 is a schematic cross-sectional view showing another example of a battery according to the present modification. As shown in FIG. 24, the battery 102a has a structure in which side surfaces of the battery 102 are covered with sealing members 60a and 60b. The side surface of the battery 102 covered with the sealing members 60a and the side surface of the battery 102 covered with the sealing members 60b are placed opposite each other. The side surfaces of the battery 102 are covered. Further, in the battery 102a, the side surfaces of the battery 102a are not entirely covered with the sealing materials 60a or 60b. For example, for the purpose of connecting the leads through which to take out electricity, the sealing members 60a do not cover portions of a side surface on which the collectors 25 are exposed, and the sealing members 60b do not cover portions of a side surface on which the collectors 11 are exposed.

Thus, using the method for manufacturing a battery according to the present modification makes it possible to achieve a parallel-laminated high-capacity battery 102 that exhibits an effect similar to that of the battery 50 according to Embodiment 1.

Embodiment 3

The following describes Embodiment 3. The following describes Embodiment 3 with a focus on differences from Embodiments 1 and 2, and omits or simplifies a description of common features.

Figure 25:
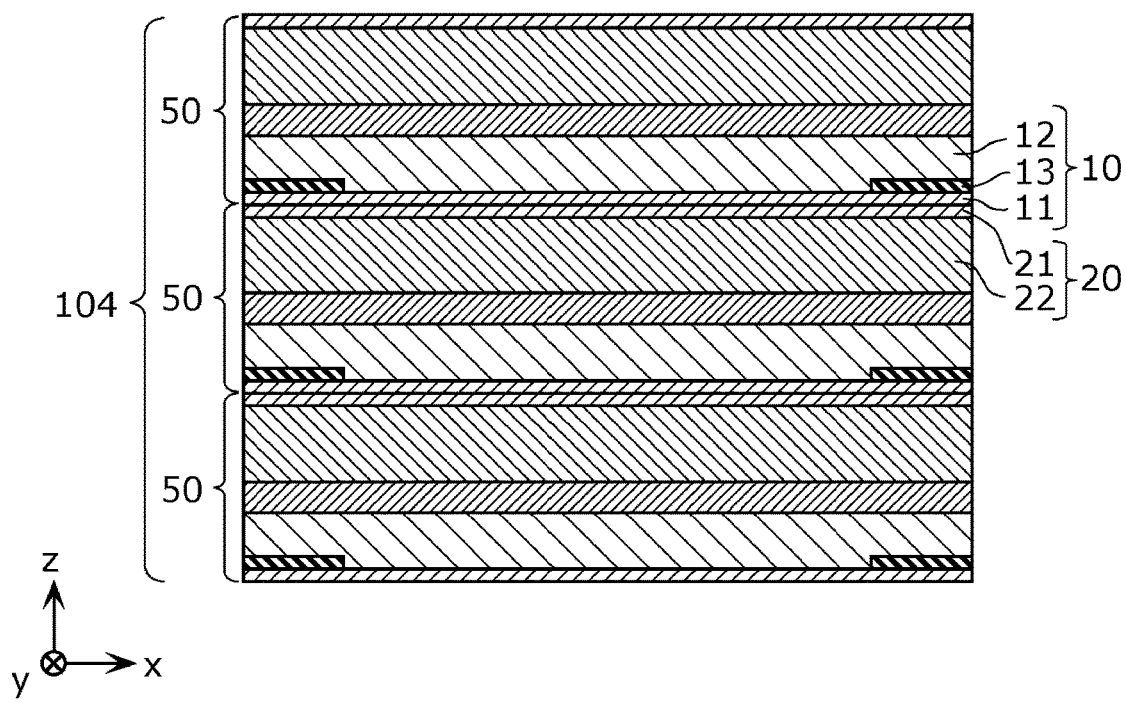
FIG. 25 is a schematic cross-sectional view showing an example of a battery according to Embodiment 3.

FIG. 25 is a cross-sectional view schematically showing a configuration of a battery according to the present embodiment. As shown in FIG. 25, the battery 104 includes a plurality of the batteries 50 according to Embodiment 1, and has a structure in which the plurality of batteries 50 are laminated. The plurality of batteries 50 are laminated such that the electrode layer 10 of a first one of batteries 50 adjacent to each other in the laminating direction and the counter-electrode layer 20 of a second one of the adjacent batteries 50 face each other. That is, the battery 104 is a series-laminated battery. This makes it possible to achieve a high-voltage battery 104 through the use of batteries 50 according to Embodiment 1.

A side surface of the battery 104 is a flat surface, and in other words, the respective side surfaces of the plurality of batteries 50 are flush with one another. For the purpose of connecting leads or other wires, the plurality of batteries 50 may be laminated out of alignment in a direction perpendicular to the laminating direction.

The battery 104 is manufactured, for example, by laminating the plurality of batteries 50 such that the electrode layer 10 of a first one of batteries 50 adjacent to each other in the laminating direction and the counter-electrode layer 20 of a second one of the adjacent batteries 50 face each other. Alternatively, the battery 104 may be manufactured by, before cutting a laminated polar plate 41 (see FIG. 7A), laminating a collector 21 on a side of the power-generating element 40 that is opposite to the collector 11, laminating a plurality of the laminated polar plate 41 on which the collector 21 is laminated, and then cutting in the laminating direction at a position where the insulating layers 13 are divided.

Although the batteries 50 are laminated to give a structure in which two collectors 11 and 21 are adjacent to each other, a battery may be free from either of the adjacent collectors 11 and 21.

Figure 26:
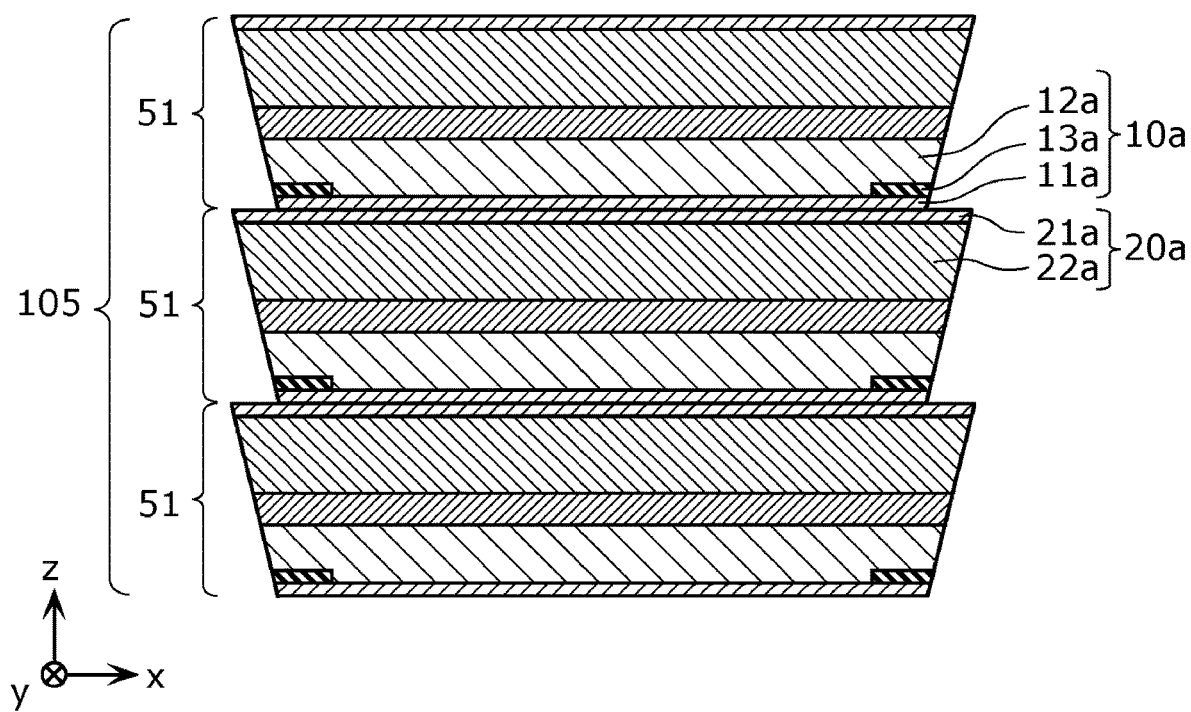
FIG. 26 is a schematic cross-sectional view showing another example of a battery according to Embodiment 3.

Further, FIG. 26 is a cross-sectional view schematically showing a configuration of another example of a battery according to the present embodiment. As shown in FIG. 26, the battery 105 includes a plurality of the batteries 51 according to Modification 1 of Embodiment 1, and has a structure in which the plurality of batteries 51 are laminated. The plurality of batteries 51 are laminated such that the electrode layer 10a of a first one of batteries 51 adjacent to each other in the laminating direction and the counter-electrode layer 20a of a second one of the adjacent batteries 51 face each other. That is, the battery 105 is a series-laminated battery. This makes it possible to achieve a high-voltage battery 105 through the use of batteries 51 according to Modification 1 of Embodiment 1.

Although the batteries 104 and 105 are series-laminated batteries, they may be parallel-laminated batteries having a structure in which the electrode layers or counter-electrode layers of adjacent single cells face each other. A parallel-laminated battery can achieve a high-capacity battery.

Thus, laminating the batteries 50 or 51, which are single cells, makes it possible to achieve a high-capacity or high-voltage battery that can exhibit an effect similar to that of the batteries 50 or 51.

Other Embodiments

In the foregoing, a battery according to the present disclosure and a method for manufacturing the same have been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

Although, in each of the foregoing embodiments, the battery is constituted by a collector, an insulating layer, an electrode active material layer, a solid electrolyte layer, and a counter-electrode active material layer, this is not intended to impose any limitation. For example, a bonding layer or other layers for reducing electric resistance and improving bonding strength may be provided between each of the layers of the battery and another.

Further, in each of the foregoing embodiments, in addition to including the insulating layer located between the collector and the electrode active material layer at ends of the electrode layer, the battery may further include a second insulating layer located between the collector and the counter-electrode active material layer at ends of the counter-electrode layer. In this case, the length of the second insulating layer from the outer periphery of the electrode active material layer may be shorter than the length of the insulating layer from the outer periphery of the electrode active material layer. This reduces exposure of the counter-electrode active material layer even in a case where ends of the collector on the counter-electrode active material layer peel, and also brings about an effect of making the area of the electrode active material layer substantially smaller than the area of the counter-electrode active material layer, as the second insulating layer is narrower than the insulating layer in plan view.

Further, although, in each of the foregoing embodiments, the insulating layer is in the shape of a frame located on the outer periphery of the electrode layer in plan view, this is not intended to impose any limitation. For example, in the battery, there may be a region on the outer periphery of the electrode layer where the insulating layer is not provided.

Further, for example, in each of the foregoing embodiments, the battery may not include a collector on the counter-electrode active material layer in a case where the battery is surrounded by a chassis or substrate and a portion of the chassis or substrate functions as a collector. In other words, the counter-electrode layer may be constituted by the counter-electrode active material layer.

Further, although, in each of the foregoing embodiments, the collector, the electrode active material layer, the solid electrolyte layer, and the counter-electrode active material layer are identical in shape and position in plan view, this is not intended to impose any limitation. At least one of the collector, the electrode active material layer, the solid electrolyte layer, and the counter-electrode active material layer may be different in shape or position in plan view. For example, the collector may have a terminal that projects from an end of the electrode active material layer in plan view and through which the collector is connected to a lead or other wires. In other words, the collector may have a region disposed outside the electrode active material layer in plan view.

Further, although, in each of the foregoing embodiments, a power-generating element is formed by sequentially laminating the electrode active material layer, the solid electrolyte layer, and the counter-electrode active material layer over the collector in the power-generating element laminating step (b), this is not intended to impose any limitation. For example, in the power-generating element laminating step (b), a power-generating element may be formed by sequentially laminating the electrode active material layer, the solid electrolyte layer, and the counter-electrode active material layer over a sheet-like substrate, and the power-generating element thus formed may be removed from the substrate and laminated on the collector.

Further, the foregoing embodiments are subject, for example, to various changes, substitutions, additions, and omissions in the scope of the claims or the scope of equivalents thereof.

A battery according to the present disclosure may be used as a secondary battery such as an all-solid battery for use, for example, in various types of electronics, automobiles, or other devices.

What is claimed is:

1. A method for manufacturing a battery, the method comprising:
    laminating an insulating layer on a part of at least one surface of at least one first collector;
    laminating at least one power-generating element in which an electrode active material layer, a solid electrolyte layer, and a counter-electrode active material layer are laminated in this order and the at least one first collector on which the insulating layer is laminated such that the electrode active material layer covers the insulating layer to form a stack;
    cutting the stack in a laminating direction at a position where the insulating layer is divided, the stack including the at least one first collector on which the at least one power-generating element is laminated; and
    before or after cutting the stack, laminating a second collector on a surface of the at least one power-generating element that is opposite to the at least one first collector.

2. The method according to claim 1, wherein
the electrode active material layer is a positive-electrode active material layer, and
the counter-electrode active material layer is a negative-electrode active material layer.

3. The method according to claim 1, wherein
the at least one first collector comprises a plurality of first collectors,
in the laminating the insulating layer, the insulating layer is laminated only on one surface of each of the plurality of first collectors,
the laminating of the at least one power-generating element includes
    forming a plurality of first laminated bodies by laminating the at least one power-generating element on each of the plurality of first collectors on which the insulating layer is laminated such that the electrode active material layer covers the insulating layer, and
    laminating the plurality of first laminated bodies such that positions of insulating layers of the plurality of first laminated bodies overlap each other in plan view,
in the laminating the plurality of first laminated bodies, the plurality of first laminated bodies is laminated such that the counter-electrode active material layer of a first one of two adjacent first laminated bodies included in the plurality of first laminated bodies faces the first collector of a second one of the two adjacent first laminated bodies, and
in the cutting the stack, the plurality of first laminated bodies is collectively cut in the laminating direction at the position where the insulating layer is divided.

4. The method according to claim 1, wherein
the at least one first collector comprises a plurality of first collectors,
in the laminating the insulating layer, the insulating layer is laminated only on one surface of each of the plurality of first collectors,
the laminating of the at least one power-generating element includes
    forming a plurality of second laminated bodies by laminating the at least one power-generating element on each of the plurality of first collectors on which the insulating layer is laminated such that the counter-electrode active material layer and a surface of the first collector on which the insulating layer is not laminated face each other, and
    laminating the plurality of second laminated bodies such that positions of insulating layers of the plurality of first laminated bodies overlap each other in plan view,
in the laminating the plurality of second laminated bodies, the plurality of second laminated bodies is laminated such that the electrode active material layer of a first one of two adjacent second laminated bodies included in the plurality of second laminated bodies covers the insulating layer of a second one of the two adjacent second laminated bodies, and
in the cutting the stack, the plurality of second laminated bodies is collectively cut in the laminating direction at the position where the insulating layer is divided.

5. The method according to claim 1, wherein
the at least one power-generating element comprises two power-generating elements,
in the laminating the insulating layer, the insulating layer is laminated on both surfaces of the at least one first collector,
in the laminating the at least one power-generating element, the at least one first collector on which the insulating layer is laminated, the two power-generating elements, and a third collector are laminated such that the at least one first collector is sandwiched between the two power-generating elements so as for the electrode active material layer to cover the insulating layer laminated on both surfaces of the at least one first collector and such that a first one of the two power-generating elements is sandwiched between the at least one first collector on which the insulating layer is laminated and the third collector,
in the cutting the stack, the at least one first collector on which the third collector and the two power-generating elements are laminated is cut in the laminating direction at the position where the insulating layer is divided, and
in the laminating the second collector, the second collector is laminated on a side of a second one of the two power-generating elements that is opposite to the first collector.

6. The method according to claim 1, wherein, in the laminating the at least one power-generating element, the at least one power-generating element is formed by the electrode active material layer, the solid electrolyte layer, and the counter-electrode active material layer being sequentially laminated over the at least one first collector.

7. The method according to claim 1, wherein
in the laminating the insulating layer, the insulating layer is laminated into a grating shape or a striped shape in plan view on at least one surface of the at least one first collector, and
in the cutting the stack, the at least one first collector on which the at least one power-generating element is laminated is cut along the insulating layer.

8. The method according to claim 1, wherein the insulating layer contains resin.

9. The method according to claim 1, wherein the insulating layer contains a metal oxide.

10. The method according to claim 1, wherein in the laminating the at least one power-generating element, the at least one power-generating element is laminated by using a wet coating method.

* * * * *